(12) United States Patent
Farmer et al.

(10) Patent No.: US 10,830,895 B2
(45) Date of Patent: Nov. 10, 2020

(54) SECURE GLOBAL NAVIGATION SATELLITE SYSTEMS

(71) Applicant: QUALCOMM Incorporated, San Diego, CA (US)

(72) Inventors: Dominic Gerard Farmer, San Jose, CA (US); Mangesh Chansarkar, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 388 days.

(21) Appl. No.: 15/787,262

(22) Filed: Oct. 18, 2017

(65) Prior Publication Data
US 2019/0113625 A1  Apr. 18, 2019

(51) Int. Cl.
*G01S 19/20* (2010.01)
*G01S 19/08* (2010.01)
(Continued)

(52) U.S. Cl.
CPC .......... *G01S 19/20* (2013.01); *G01S 5/0018* (2013.01); *G01S 19/07* (2013.01); *G01S 19/071* (2019.08);
(Continued)

(58) Field of Classification Search
None
See application file for complete search history.

(56) References Cited

U.S. PATENT DOCUMENTS

| 7,574,215 B1 | 8/2009 | Fan et al. |
| 8,423,768 B2 | 4/2013 | Huang et al. |

(Continued)

FOREIGN PATENT DOCUMENTS

| CN | 1416652 A | 5/2003 |
| EP | 1697756 A1 | 9/2006 |

(Continued)

OTHER PUBLICATIONS

International Search Report and Written Opinion—PCT/US2018/056089—ISA/EPO—dated Jan. 9, 2019.
(Continued)

*Primary Examiner* — Whitney Moore
(74) *Attorney, Agent, or Firm* — Paradice and Li LLP

(57) ABSTRACT

Apparatuses and methods of securing Global Navigation Satellite Systems are disclosure. In one exemplary embodiment, a mobile device may comprise: a communication interface configured to monitor signals from a plurality of satellites, a processor configured to determine impairment of one or more satellites in the plurality of satellites using the signals form the plurality of satellites, a memory configured to store a status of the determined impairment of one or more satellites in the plurality of satellites, and the communication interface that transmits the status of the determined impairment of the one or more satellites in the plurality of satellites to a server. The processor further determines a position of the mobile device using the status of the determined impairment of one or more satellites in the plurality of satellites, and stores the determined position and a corresponding digital certificate indicative of authenticity of the determined position in a memory.

30 Claims, 23 Drawing Sheets

(51) Int. Cl.
 *G01S 19/07* (2010.01)
 *G01S 19/42* (2010.01)
 *G01S 5/00* (2006.01)

(52) U.S. Cl.
 CPC .......... *G01S 19/072* (2019.08); *G01S 19/074* (2019.08); *G01S 19/08* (2013.01); *G01S 19/42* (2013.01)

(56) References Cited

U.S. PATENT DOCUMENTS

| | | |
|---|---|---|
| 8,538,458 B2 | 9/2013 | Haney |
| 8,837,733 B2 | 9/2014 | Alpert et al. |
| 8,938,621 B2 | 1/2015 | Mao et al. |
| 9,217,792 B2 | 12/2015 | Wu |
| 2001/0024433 A1 | 9/2001 | Vanttinen et al. |
| 2003/0035544 A1 | 2/2003 | Herle et al. |
| 2004/0248551 A1 | 12/2004 | Rowitch et al. |
| 2005/0104772 A1 * | 5/2005 | Diggelen ................ G01S 19/05 342/357.45 |
| 2007/0086382 A1 | 4/2007 | Narayanan et al. |
| 2007/0135089 A1 | 6/2007 | Edge et al. |
| 2007/0182547 A1 | 8/2007 | Wachter et al. |
| 2007/0200756 A1 | 8/2007 | Saito |
| 2009/0100260 A1 | 4/2009 | Govindarajan |
| 2009/0106259 A1 | 4/2009 | Ui et al. |
| 2010/0007553 A1 | 1/2010 | Kim et al. |
| 2010/0205435 A1 | 8/2010 | Xie |
| 2010/0241864 A1 | 9/2010 | Kelley et al. |
| 2010/0285834 A1 | 11/2010 | Hutchison, I |
| 2011/0187593 A1 | 8/2011 | Gaal et al. |
| 2012/0264448 A1 | 10/2012 | Wachter et al. |
| 2013/0014231 A1 | 1/2013 | Chu et al. |
| 2014/0006785 A1 | 1/2014 | Shaliv et al. |
| 2014/0351886 A1 | 11/2014 | Edge et al. |
| 2015/0009088 A1 | 1/2015 | Werner |
| 2017/0070971 A1 * | 3/2017 | Wietfeldt .............. H04W 64/00 |

FOREIGN PATENT DOCUMENTS

| | | |
|---|---|---|
| JP | 2002271840 A | 9/2002 |
| JP | 2004032376 A | 1/2004 |
| JP | 2004153721 A | 5/2004 |
| JP | 2008535426 A | 8/2008 |
| WO | WO-03036919 A2 | 5/2003 |
| WO | 2005004527 A1 | 1/2005 |
| WO | 2007025143 A1 | 3/2007 |
| WO | WO-2017040076 A1 | 3/2017 |

OTHER PUBLICATIONS

Kaplan D., et al., "Understanding GPS", Principles and Applications, 2006, pp. 1-3.

* cited by examiner

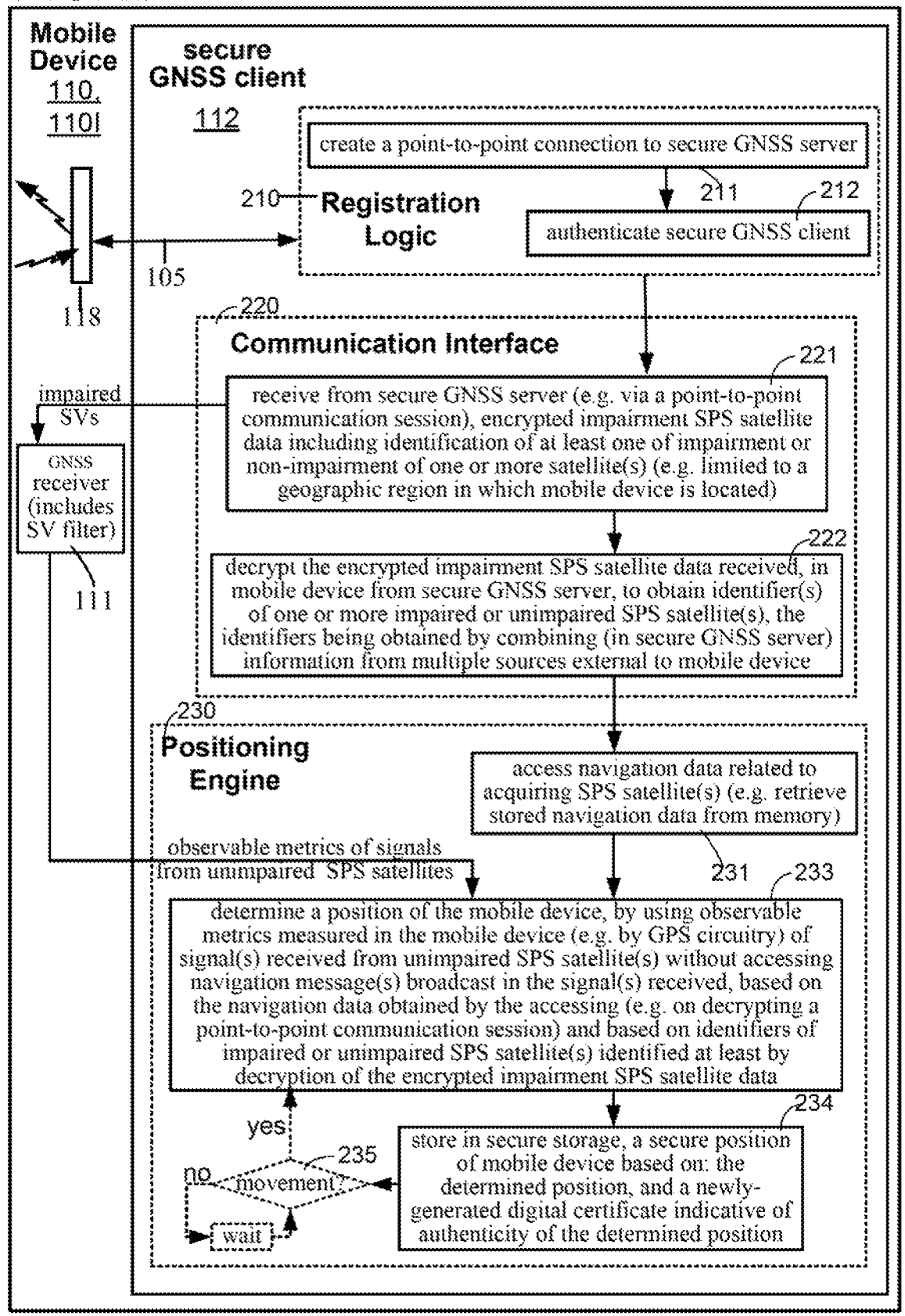

FIG. 2C

Mobile Device 110, 110l

Positioning Engine 230

233 — determine a position of mobile device (based on unimpaired SPS satellite(s), by using only observable metrics therefrom)

retrieve from memory identifiers of impaired SPS satellite decrypted from impairment SPS satellite data and/or identify satellite(s) as mobile-RAIM-failed based on, for example, outlier detection using observable metrics and/or clock offset between GNSS time base & Tx time of signal at cellular station

241

242 — identify unimpaired SPS satellites (e.g. after subjecting impaired satellites identified by co-located mobiles to additional tests); generate pseudoranges based on observable metrics of signals from at least satellites identified as unimpaired; pseudoranges generated include unimpaired pseudorange(s) between mobile device and unimpaired SPS satellite(s);

243 — apply receiver autonomous integrity monitoring (RAIM) internally, to detect SVs that fail, and transmit to server: IDs of mobile-RAIM-failed SVs ← clock offset
← sensor measurement

244 — apply to unimpaired pseudoranges, one or more corrections (e.g. corrections for clock offset, relativistic effects, ionospheric signal propagation delays)

245 — ascertain a position of each unimpaired SPS satellite that is visible, based on ephemeris of said unimpaired SPS satellite

246 — Triangulate for 3D position and clock offset of mobile device (e.g. by solving simultaneous equations using mobile device's x,y,z,t as 4 unknown variables), based on positions of unimpaired SPS satellites and unimpaired pseudoranges

234 — Store 3D co-ordinates of mobile device's position, in secure storage

FIG. 2D

Mobile Device 110

Positioning Engine 230 determine a position of mobile device (based on unimpaired SPS satellite(s), by using only observable metrics therefrom) — 233 retrieve from memory impaired SPS satellite ID(s) decrypted from impairment SPS satellite data and/or identify satellite(s) as mobile-RAIM-failed based on, for example, outlier detection using observable metrics and/or clock offset between GNSS time base & Tx time of signal at cellular station

— 241 generate pseudoranges based on observable metrics of signals from SPS satellites identified as unimpaired; pseudoranges generated include unimpaired pseudorange(s) between the mobile device and the unimpaired SPS satellite(s);

— 242 generate pseudoranges based on observable metrics of signals from impaired SPS satellites; pseudoranges generated include impaired pseudorange(s) between the mobile device and impaired SPS satellite(s);

— 261 discard impaired pseudorange(s) — 262

— 244 apply to unimpaired pseudoranges, one or more corrections (e.g. corrections for clock offset, relativistic effects, ionospheric signal propagation delays)

— 245 ascertain a position of each unimpaired SPS satellite that is visible, based on ephemeris of said unimpaired SPS satellite

— 246

Triangulate for 3D position and clock offset of mobile device (e.g. by solving simultaneous equations), based on positions of unimpaired SPS satellites and unimpaired pseudoranges Store 3D co-ordinates of mobile device's position, in secure storage — 234

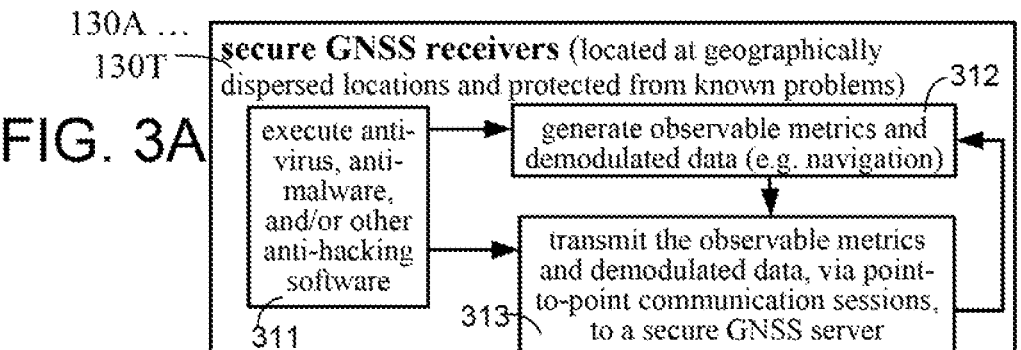
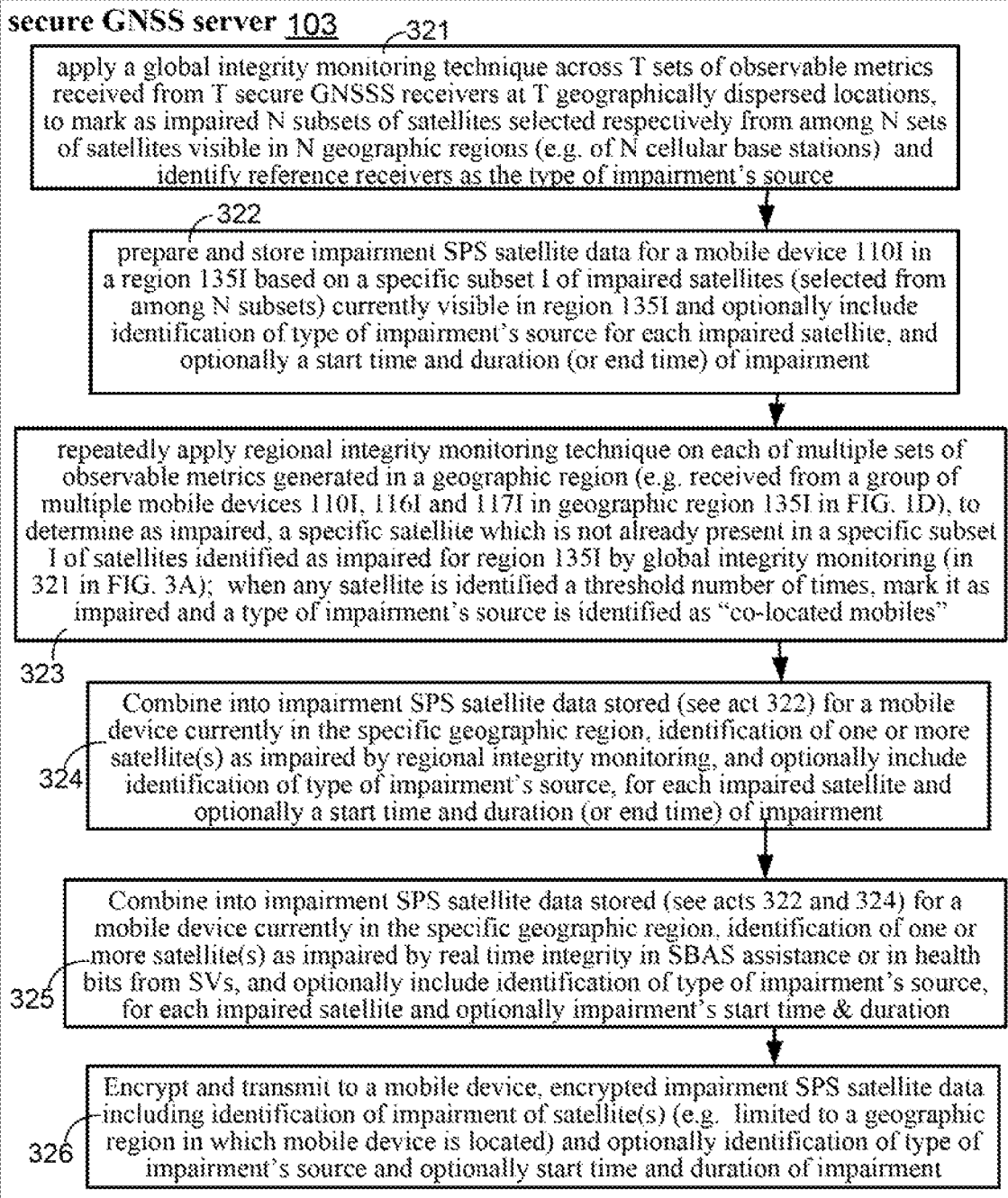

FIG. 4A

Mobile Device or Server determine a position of mobile device (based on unimpaired SPS satellite(s), by using only observable metrics therefrom)

410

- 411: retrieve from memory pseudoranges, time and ephemeris of a specific unimpaired SV
- 412: using time and ephemeris, compute state of SV (position, velocity, etc), repeat for each unimpaired SV
- 413: setup Pseudorange Equations PR = Bias + SQRT(SV Position − mobile device's Position)
- 414: solve Linearized Pseudorange Equations using Weighted Least Squares Formulation
- 415: store in memory, mobile device's Position, Time

FIG. 4B

Mobile Device 110

Communication Interface 220 identify impaired SVs using observable metrics
(based on GSM-GNSS clock offset) — 226

420

421: (a) Compute Time using GSM/Cell Offsets as follows:
Time = Local Cellular time + Time Offset
(b) Determine Uncertainty in Computed Time as follows:
Uncertainty = Uncertainty of Local Cellular Time
+ Uncertainty of Time Offset 422: Determine a time of signal transmission from a GNSS SV, as follows:
Time of Transmission = SV Bit number + SV Bit Offset + SV Code Phase 423: Is approximate position known (e.g. location of cell tower)?

425 (yes): Received Time = Time of Transmission + Time of Flight 424 (no): Received Time = Time of Transmission + Default Time of Flight;
Received Time Uncertainty = Uncertainty of Approximate Position/Speed of Light 426: Compare (a) received time from specific SV with (b) time computed (e.g. in act 421 above)

427: If the times (a), (b) differ by more than a threshold (which may be predetermined, or automatically selected), identify specific SV as RAIM-failed, else confirm the specific SV as unimpaired 428: store in memory of mobile device, identification made (in act 427) if this SV is identified as mobile-RAIM-failed (or mark SV in memory as unimpaired if confirmed), and send an identifier of mobile-RAIM-failed SV to server repeat for each visible SV

```
┌─ 722
│ Receive an identifier of an impaired satellite from a mobile
│ device, where the impaired satellite is determined by the mobile
│ device based on comparing a measured time of signal
│ transmission between a satellite and a known location to a
│ computed time of signal transmission between the satellite and
│ the known location; and identifying the satellite as the impaired
│ satellite in response to a difference between the measured time
│ and the computed time being larger than a second reference
│ threshold
└─
```

FIG. 7C

```
┌─ 724
│ Assist positioning of a mobile device, using the status of the
│ determined impairment of the one or more satellites in the
│ plurality of satellites, via a point-to-point communication session
│ with the mobile device
└─
```

FIG. 7D

SECURE GLOBAL NAVIGATION SATELLITE SYSTEMS

BACKGROUND

1. Background Field

This patent application relates to devices and methods for securing a Global Navigation Satellite System (GNSS), by use of point-to-point sessions, to transfer encrypted data related to position determination, between mobile devices and a server.

2. Background Information

Position location technologies typically utilize wireless signals concurrently transmitted from known locations to determine position. In many prior art technologies, the wireless signals are concurrently transmitted from a multiplicity of satellites (in satellite positioning systems) at a known time, and with a predefined frequency. For example, the Global Positioning System (GPS), the GLONASS owned by the Russian Federation Government, Quasi-Zenith Satellite System (QZSS) over Japan, Indian Regional Navigational Satellite System (IRNSS) over India, Beidou over China and Galileo over Europe, are satellite systems that provide users equipped with a GNSS receiver the ability to determine their location. A GNSS receiver determines its location by measuring signals transmitted by the GNSS satellites. Specifically, a GNSS receiver acquires a signal from each satellite within its view of the sky. The times of arrival of the signals along with the exact location of the in-view satellites and the exact times the signals were transmitted from each satellite are used to locate the position of the GNSS receiver, via a trilateration calculation well known in the art.

There are multiple functions implemented by an exemplary GNSS receiver of such satellite signals: (1) computation of pseudoranges to the various satellites, (2) based on data transmitted in the satellite signals, determination of satellite timing, and extraction of ephemeris (position) data, and (3) based on a combination of these (specifically, pseudoranges, timing and ephemeris) computation of the position of the satellite receiver. Pseudoranges (PRs) measure the time delays (or equivalently the ranges) between the satellites and the receiver, with a bias due to (a) the local clock in the receiver and (b) satellite clock. In conventional autonomous satellite receivers, the satellite ephemeris and time of transmission data are extracted from the satellite signal, once the satellite signal is acquired and tracked.

However, GNSS signals are relative easy to spoof. Spoofed GNSS signals can provide incorrect observable metrics (e.g. Time, C/No, Doppler, pseudorange, Carrier Phase). Spoofing of data modulated in a signal can present incorrect ephemeris and almanac information (orbit/clock/health). There appear to be no built-in authentication methods for civilian signals, although GPS has Y code for military users. A certification method fur civilian use appears to be in discussion, for Galileo. And, currently, there appears to be no built in authentication methods for civilian use of such GNSS signals. Even when not spoofed, actual GNSS signals are not guaranteed to be correct all the time. For example, GNSS constellations can break due to: (a) single satellite failures, for example unpredicted clock errors or other satellite vehicle (SV) malfunctions, (b) system wide failures, for example, corrupt upload of content such as the Glonass ephemeris failures, and (c) constellation can be intentionally directed to not comply with a published standard (e.g. ICD). GNSS failures of the type described above can affect various applications and/or users, such as: accurate timing of transactions, authentication of transactions (relying on trusted location sources), synchronization of infrastructure (Power, Communications), positions used by E911/public safety, positions for navigation, automobile positioning on a map and route guidance, precision agriculture, positioning of drones, etc. Hence, improvements of the type described below are needed.

SUMMARY

Apparatuses and methods of securing Global Navigation Satellite Systems are disclosure. In one exemplary embodiment, a mobile device may comprise: a communication interface configured to monitor signals from a plurality of satellites, a processor configured to determine impairment of one or more satellites in the plurality of satellites using the signals form the plurality of satellites, a memory configured to store a status of the determined impairment of one or more satellites in the plurality of satellites, and the communication interface is further configured to transmit the status of the determined impairment of the one or more satellites in the plurality of satellites to a server.

In another exemplary embodiment, a method of securing a Global Navigation Satellite System, may comprise: monitoring, by a communication interface of a mobile device, signals from a plurality of satellites, determining, by a processor of the mobile device, impairment of one or more satellites in the plurality of satellites using the signals form the plurality of satellites, storing, in a memory of the mobile device, a status of the determined impairment of one or more satellites in the plurality of satellites, and transmitting, by the communication interface of the mobile device, the status of the determined impairment of the one or more satellites in the plurality of satellites to a server.

In yet another exemplary embodiment, a server may comprise a transceiver configured to receive data collected from a plurality of satellites by a set of GNSS receivers, a processor configured to determine impairment of one or more satellites in the plurality of satellites, a memory configured to store a status of the determined impairment of one or more satellites in the plurality of satellites, and the transceiver is further configured to provide the status of the determined impairment of the one or more satellites in the plurality of satellites to one or more mobile devices. The determined impairment of one or more satellites in the plurality of satellites may comprise at least one of: an integrity impairment received from an augmentation system, an identification of a type of source of the integrity impairment, or a combination thereof. The data collected from the plurality of satellites may comprise observable metrics of the plurality of satellites, modulation data of the plurality of satellites, or some combinations thereof in some aspects, the set of GNSS receivers are located at geographically dispersed locations, and the set of GNSS receivers are protected from viruses, malware attacks and remote administration technologies.

In yet another exemplary embodiment, a method of securing a Global Navigation Satellite System, may comprise: receiving, by a transceiver of a server, data collected from a plurality of satellites by a set of GNSS receivers, determining, by a processor of the server, impairment of one or more satellites in the plurality of satellites, storing, in a memory of the server, a status of the determined impairment of one or more satellites in the plurality of satellites, and providing, by the transceiver of the server, the status of the determined impairment of the one or more satellites in the plurality of satellites to one or more mobile devices.

In some aspects, encrypted impairment SPS satellite data that includes identification of at least one of impairment or non-impairment of one or more satellite(s) in a satellite positioning system (SPS) may be received, from a wireless transmitter (e.g. of a cellular base station). Note that satellites are also sometimes referred to as satellite vehicles, abbreviated as SV in the following description. Identifier(s) of one or more impaired or unimpaired SPS satellite(s) may be decrypted from the encrypted impairment SPS satellite data received. Prior to their transmission by the wireless transmitter, the just-described identifiers of impaired (or unimpaired) SPS satellite(s) may be obtained by combining information from multiple sources, which are external to a mobile device. A position of the mobile device may be then determined, by using a plurality of observable metrics measured in the mobile device, of signals received from unimpaired SPS satellites without accessing navigation messages broadcast in the signals, based on access of navigation data related to acquiring SPS satellites stored in memory, and based on the identifier(s) of the one or more impaired or unimpaired SPS satellite(s).

In certain embodiments, a method includes receiving in a mobile device from a wireless transmitter, encrypted impairment SPS satellite data that comprises identification of at least one of impairment or non-impairment of one or more satellite(s) in a satellite positioning system (SPS). The method includes decrypting from the encrypted impairment SPS satellite data received in the mobile device, identifier(s) one or more impaired or unimpaired SPS satellite(s) obtained by combining information from multiple sources external to the mobile device. The method includes, accessing navigation data related to acquiring SPS satellites. The method includes determining a position of the mobile device, by using observable metrics measured in the mobile device of signals received from unimpaired SPS satellites without accessing navigation messages broadcast in the signals, based on the navigation data accessed by the accessing, and based on the identifier(s) of the one or more impaired or unimpaired SPS satellite(s) decrypted by the decrypting. Depending on the embodiment, the just-described accessing and determining may be performed in the mobile device, or performed in a server which receives the observable metrics measured in the mobile device.

In several embodiments, a mobile device includes a wireless receiver configured to receive from a wireless transmitter, encrypted impairment SPS satellite data that comprises identification of at least one of impairment or non-impairment of one or more satellite(s) in a satellite positioning system (SPS). The just-described mobile device also includes one or more processor(s) coupled to the wireless receiver. The one or more processor(s) are configured to decrypt from the encrypted impairment SPS satellite data received in the mobile device, identifier(s) of one or more impaired or unimpaired SPS satellite(s) obtained by combining information from multiple sources external to the mobile device. The one or more processor(s) are also configured clock offset access navigation data related to acquiring SPS satellites. The one or more processor(s) are further configured to determine a position of the mobile device, by using observable metrics measured in the mobile device of signals received from unimpaired SPS satellites without accessing navigation messages broadcast in the signals, based on the navigation data accessed by the one or more processor(s) configured to access, and based on the identifier(s) of the one or more impaired or unimpaired SPS satellite(s) decrypted by the one or more processor(s) configured to decrypt.

In some embodiments, one or more non-transitory computer-readable storage media have stored thereon, instructions, which, when executed by one or more computer(s), cause one or more processor(s) in the computer(s) to receive encrypted impairment SPS satellite data that comprises identification of at least one of impairment or non-impairment of one or More satellite(s) in a satellite positioning system (SPS). The just-described instructions, when executed by the one or more computer(s), may further cause the one or more processor(s) in the computer(s) to decrypt from the encrypted impairment SPS satellite data, identifier(s) of one or more impaired or unimpaired SPS satellite(s) that may be obtained by combining information from multiple sources external to the computer(s). The just-described instructions, when executed by the one or more computer(s), may also cause the one or more processor(s) in the computer(s) to access navigation data related to acquiring SPS satellites. The just-described instructions, when executed by the one or more computer(s), may further cause the one or more processor(s) in the computer(s) to determine a position of a mobile device, by using observable metrics measured in the mobile device of signals received from unimpaired SPS satellites without accessing navigation messages broadcast in the signals, based on the navigation data accessed execution of the instructions to access, and based on the identifier(s) of the one or more impaired or unimpaired SPS satellite(s) decrypted by execution of the instructions to decrypt.

In many embodiments, an apparatus includes means for receiving encrypted impairment SPS satellite data that comprises identification of at least one of impairment or non-impairment of one or more satellite(s) in a satellite positioning system (SPS), means for decrypting from the encrypted impairment SPS satellite data received by the means for receiving, identifier(s) of one or more impaired or unimpaired SPS satellite(s) obtained by combining information from multiple sources external to the apparatus, means for accessing navigation data related to acquiring SPS satellites, and means for determining a position of a mobile device, by using observable metrics measured in the mobile device of signals received from unimpaired SPS satellites without accessing navigation messages broadcast in the signals, based on the navigation data accessed by the means for accessing, and based on the identifier(s) of the one or more impaired or unimpaired SPS satellite(s) decrypted by the means for decrypting.

It is to be understood that several other aspects and embodiments will become readily apparent to those skilled in the art from the description herein, wherein it is shown and described in various aspects and embodiments, by way of illustration. The drawings and detailed description below are to be regarded as illustrative in nature and not as restrictive.

BRIEF DESCRIPTION OF DRAWINGS

FIG. 1F illustrates, another data structure included in navigation data sent from server 103 to mobile device 110 in some embodiments of the type shown in FIGS. 1A-1C.

FIG. 2A illustrates, in a high-level flow chart, certain operations that are performed in certain embodiments, by one or more processors in a mobile device 110 of FIGS. 1A-1C and mobile devices 137A-137N of FIG. 1D.

FIG. 2C illustrates, in an intermediate-level flow chart, acts performed in some embodiments within a position determination operation 233 shown in FIGS. 2A and 2B.

FIG. 2D illustrates, in another intermediate-level flow chart, several embodiments that perform some acts similar to (or identical to) those shown in FIG. 2C, and in addition perform one or more other acts.

FIG. 3A illustrates, in an intermediate-level flow chart, acts performed in some embodiments of reference receivers 130A-130T that are geographically dispersed e.g. located at distant locations around the US as shown in FIG. 1C, although in other embodiments they are located across the entire world.

FIG. 3B illustrates, in an intermediate-level flow chart, acts performed in some embodiments of server 103 of the type shown in FIGS. 1C and 1D.

FIGS. 4A and 4B illustrate, in additional flow charts, acts performed in some embodiments of mobile devices 137A-137N of the type shown in FIG. 1D.

FIGS. 7A-7C illustrate various exemplary implementations of determining impairment of one or more satellites according to aspects of the present disclosure.

FIG. 7D illustrates an exemplary implementation of assisting positioning of a mobile device according to aspects of the present disclosure.

DETAILED DESCRIPTION

Figure 1A:
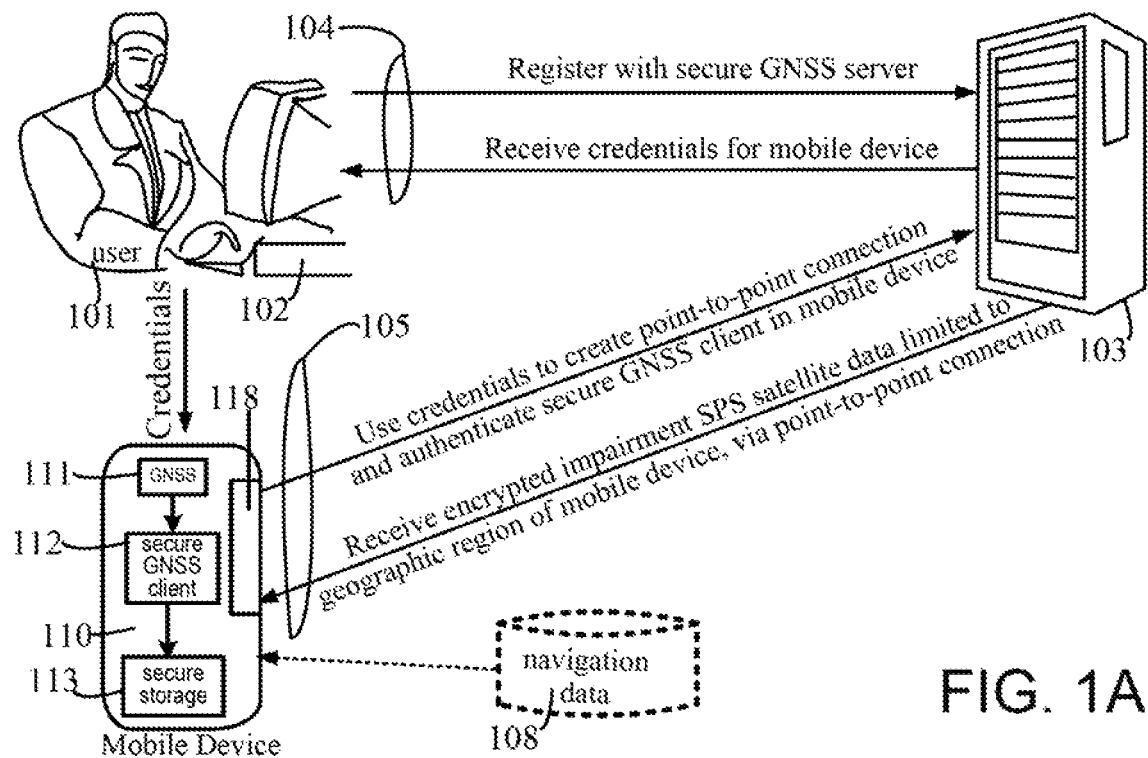
FIG. 1A illustrates interaction of a user 101 during a registration operation, obtaining credentials for use by client software 112 in a mobile device 110, to create a point-to-point connection 105 with a server 103 to receive therefrom encrypted impairment SPS satellite data, in some embodiments.
Figure 1B:
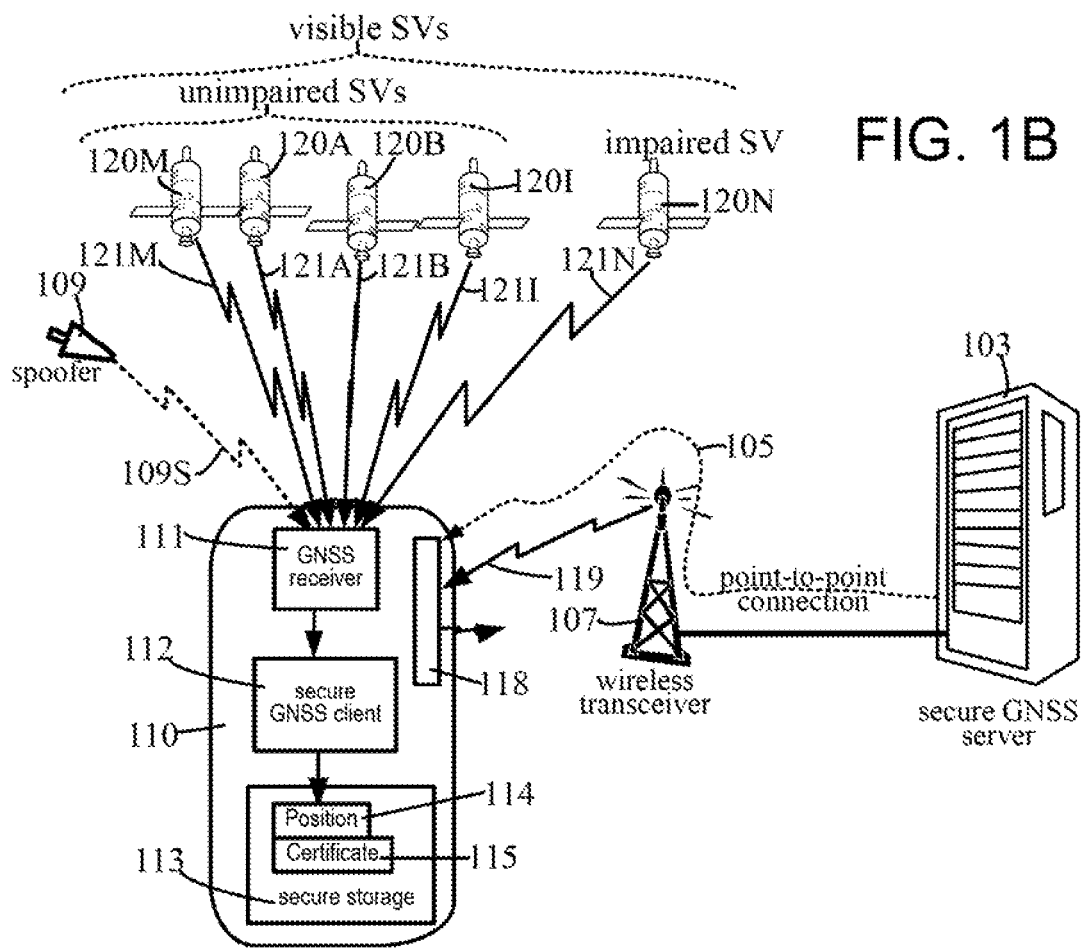
FIG. 1B illustrates mobile device 110 of FIG. 1A using encrypted impairment SPS satellite data, which is, received from server 103 via point-to-point connection 105, to determine the mobile device's position, in the presence of localized spooling (or other impairment) of one or more satellite signals.

Unless expressly stated otherwise, reference numerals identical to one another in the attached drawings of FIGS. 1A-1F, 2A-2F, 3A-3B, 4A-4D, 5A-5B, 6, 7A-7D, 8, and 9A-9D refer to components that operate similar or identical to one another, as readily apparent to a skilled artisan in view of the description below.

The detailed description set forth below in connection with the attached drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure ma be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

In several embodiments, a server 103 (FIG. 1A), which may correspond to a particular provider of assistance data on impairment (or non-impairment) of one or more satellite(s) of a satellite positioning system (SPS) to mobile devices in a geographic region, may exchange one or more messages with a mobile device 110 (FIG. 1A) and/or software provisioned therein, as part of an authentication process. Specifically, in such embodiments, server 103 is configured to provide assistance data to mobile device 110, only after authentication and registration with server 103.

Accordingly, in some embodiments, server 103 may be representative of one or more computing platforms provisioned to function similar (or identical) to a location server that provides location assistance data to mobile device 110 and receives location related information from mobile device 110. Accordingly, server 103 may configure, information in mobile device 110 related to protection of assistance data that includes information on impairment of SPS satellites. Hence, various techniques may be implemented via server 103 and/or mobile device 110 to protect such assistance data (which may include impairment SPS satellite data 140 shown in FIG. 1C, for example), as described in US Publication 2014/0351886, entitled "METHODS AND APPARATUSES FOR PROTECTING POSITIONING RELATED INFORMATION" by Stephen William Edge, and Andreas Klaus Wachter, as inventors, which is incorporated by reference herein in its entirety.

In certain instances, an authentication process used by server 103 may verify whether impairment SPS satellite data 140 (FIG. 1C) may be provided to a secure GNSS client 112 (which may be implemented as hardware or software, depending on the embodiment), provisioned within mobile device 110. Alternatively, or additionally, an authentication process used by secure GNSS client 112 may verify the identity of a particular provider represented by server 103. Accordingly, in some embodiments, server 103 and mobile device 110 may communicate with one another and/or with third party computers in a secure manner, to verify that a relationship exists between a provider of assistance data and software that needs a position of mobile device 110, to allow for transfer of impairment SPS satellite data 140 from server 103 to mobile device 110, in an encrypted manner.

Accordingly, in some embodiments, as illustrated in FIG. 1A, a user 101 may use a computer 102 in a point-to-point communication session 104 (or alternatively, mobile device 110 itself may set up a point-to-point communication session 104), to register with server (also called "secure GNSS server") 103, and on successful completion of registration (e.g. by answering questions), receive credentials during this session. Although user 101 is a human in several embodiments illustrated in FIG. 1A, one or more actions of user 101 may be performed in alternative embodiments by software executing in computer 102 and/or in mobile device 110, or a combination thereof.

The credentials received from server 103 on authentication and registration, may thereafter be used by a processor 405 (FIG. 5A) in mobile device 110 in executing instructions in client software (also called "secure GNSS client") 112 in memory 401, to create a point-to-point connection (also called "point-to-point communication session") 105 with server 103 (FIG. 1A), over a wireless link 119 (FIG. 1B) between wireless transceiver 118 in mobile device 110 and wireless transmitter 107 of a wireless network (e.g. in a cellular base station). The processor 405 in mobile device 110 may then receive, via wireless transceiver 118 through this point-to-point connection 105, encrypted impairment SPS satellite data 140 from server 103 (see FIGS. 1A, 1B and 1C) and store the received data in memory 401. Hence, in some embodiments of the type described in the preceding paragraph above, wireless transceiver 118, memory 401 and processor 405 programmed with software comprising instructions, in combination with one another implement a means for receiving information via a point-to-point communication session and a means for transmitting information via the point-to-point communication session.

In certain embodiments, the above-described point-to-point communication session 104 and 105 may be implemented with server 103 functioning as a SUPL Location Platform (SLP) and mobile device 110 functioning as a SUPL Enabled Terminal (SET). In such embodiments, server 103 and mobile device 110 may support a SUPL location solution defined by OMA, and may exchange messages with one another as part, of a SUPL session according to the SUPL Userplane Location Protocol (ULP). ULP may be used to establish and release SUPL sessions between server 103 and mobile device 110, transfer assistance data including impairment SPS satellite data 140 from server 103 to mobile device 110, and transfer one or more observable metrics from mobile device 110 to server 103 and or enable other aspects of secure transfer of information between one another, e.g. as described for PPAD and PPD in US Publication 2014/0351886. As part of a SUPL session between server 103 and mobile device 110, one or more positioning protocols may be used whose messages may be embedded inside SUPL messages (e.g. inside SUPL POS and SUPL POS INIT messages) and transferred as part of the SUPL session. The positioning protocol messages may be used in some embodiments to transfer PPAD and PPD. The positioning protocols may comprise the 3GPP defined LTE Positioning Protocol (LPP), the OMA defined LPP Extensions (LPPe) protocol, the 3GPP defined Radio Resource Control (RRC) protocol, the 3GPP defined Radio Resource LCS Protocol (RRLP) and the 3GPP2 defined IS-801 or C.S0022 protocol.

As noted herein, in some embodiments, the server 103 may need to verify the identity of a provider of a mobile device 110 in order to know, from an existing relationship, that any assistance data (e.g. impairment SPS satellite data 140) sent by server 103 will be treated securely by mobile device 110. Similarly, a mobile device 110 may need to verify the identity of a provider of server 103 in order to know that observable metrics sent by mobile device 110 to server 103 will be treated securely and/or to know that server 103 can send certain useful or reliable types of assistance data to mobile device 110. The identity of the provider of server 103 may be a name (e.g. a printable character string), a decimal number, a sequence of decimal digits, a sequence of hexadecimal digits, a sequence of characters, a binary number or some other value and may be standardized (e.g. by ISO, ITU, 3GPP, IETF) or may be proprietary.

The encrypted impairment SPS satellite data 140 (FIG. 1C) transmitted by server 103 to mobile device 110 may identify only localized impairment (or non-impairment) of one or more satellite(s) 120N (see FIG. 1B), by limiting identification of impairment(s) (or non-impairments) to a geographic region (cellular region serviced by (or covered by) wireless transmitter 107) in which is located the mobile device 110 (to which the encrypted impairment SPS satellite data is transmitted). Impairment of one or more, satellite(s), e.g. satellite 120N (see FIG. 1B) may be due to any reason, e.g. due to localized spoofing by a spoofer 109 which may be physically present in the same geographic region as mobile device 110 (e.g. within 10 miles distance). Alternatively, satellite 120N may be impaired due to some defect therein.

The impairment SPS satellite data 140 is used by mobile device 110 to determine a new position 114 (see FIG. 1B) of itself, and/or to send to server 103 measurements (or observable metrics) of signals received from satellite(s) 120A-120M (see FIG. 1A) identified as unimpaired, for use by server 103 in position determination of mobile device 110. Hence, a position of mobile device 110 may be determined (either by mobile device 110, or by server 103, or by both), by using observable metrics of satellite signals 121A-121N that are received (and one or more of which are measured) in mobile device 110. Specifically, observable metrics measured by mobile device 110, are at least of satellite signal(s) 121A-121M (see FIG. 1B) received from one or more satellite positioning system (SPS) satellite(s) 120A-120M identified as unimpaired in the impairment SPS satellite data 140 (see FIG. 1C).

Depending on the embodiment, observable metrics of signal(s) from one or more satellite(s) 121N (see FIG. 1B) identified as impaired in the impairment SPS satellite data, may be not measured by mobile device 110 (if GNSS receiver 111 therein has a filter responsive to satellite IDs), or alternatively may be measured by mobile device 110 (if GNSS receiver 111 has no filter responsive to satellite IDs), but discarded after being measured. The measurements of unimpaired observable metrics (e.g. pseudoranges) are stored in memory 401 of mobile device 110 and used in position determination, without accessing navigation message(s) broadcast in signals) 121A-121M. Instead of demodulating navigation message(s) from signal(s) 121A-121M, position determination in many embodiments may be based on navigation data 108 (see FIG. 1A) related to acquiring one or more of SPS satellite(s) 121A-121N that is accessed (e.g. by retrieval of stored version of navigation data 108 from memory), and further based on encrypted impairment SPS satellite data received securely from server 103, via a point-to-point connection 105.

Figure 1C:
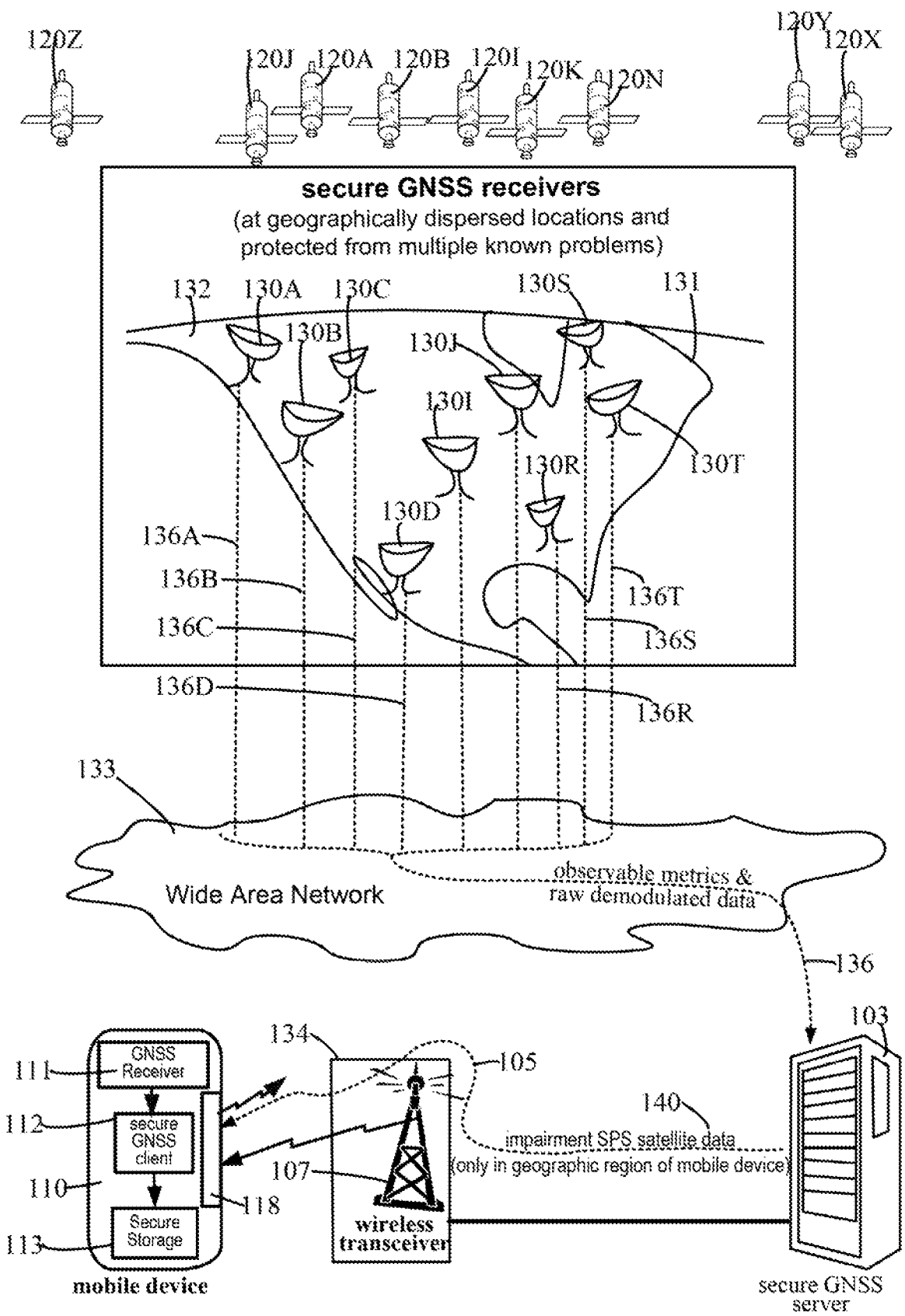
FIG. 1C illustrates, in some embodiments, server 103 of FIGS. 1A and 1B receiving raw demodulated data extracted from one or more signal(s) of corresponding one or more SPS satellite(s) from receivers 130A, 130B, 130C, . . . 130I . . . 130J . . . 130R, 130S, 103T that are T in number and located at corresponding T geographically dispersed locations which are precisely known, and that are protected from multiple known problems.

As noted above, the encrypted impairment SPS satellite data may be transmitted to mobile device 110 via the point-to-point connection (also called "point-to-point communication session") 105 from server 103, through a wireless transmitter 107 (which may be a component of a cellular base station 134 shown in FIG. 1C). Mobile device 110 may decrypt the impairment SPS satellite data 140 received from server 103, in addition to accessing the navigation data 108 (see FIG. 1A), and based thereon determine the new position 114 (see FIG. 1B), by using observable metrics of unimpaired satellite signals 121A-121M (see FIG. 1B) measured therein. Depending on the embodiment, access of navigation data 108, may be performed in mobile device 110 by a means for additionally decrypting the navigation data 108 from a point-to-point communication session, which may be implemented similar or identical to means for decrypting encrypted impairment SPS satellite data from point-to-point communication session 105.

In certain embodiments, server 103 may identify in impairment SPS satellite data 140, identifiers of one or more SPS satellite(s) 120A, . . . 120I . . . (see FIG. 1C) as impaired (or as unimpaired) in a geographic region in which mobile device 110 is located, based on observable metrics of satellite signals that are measured (e.g. to determine pseudoranges to corresponding satellites) by a number of receivers 130A, 130B, 130C, . . . 130I . . . 130R, 130S, 130T (e.g. T receivers) that are protected from multiple known problems and are located at geographically dispersed locations which are precisely known (e.g. located across the US and/or across the world), installation of the just-described receivers, also called reference receivers 130A, 130B, 130C, . . . 130U . . . 130R, 130S, 130T at geographically dispersed locations protects preparation of impairment SPS satellite data 140 by server 103, from localized spoofing and/or impairments that may occur at locations external to these receivers and/or in other regions covered by other satellites. Each of reference receivers 130A, 130B, 130C, . . . 130I . . . 130R, 130S, 130T may include a GNSS receiver coupled to memory and processor and/or position-ing engine circuitry implemented in hardware, similar or identical to mobile device 110 shown in FIG. 5A.

Observable metrics that may be measured by a mobile device 110I or a reference receiver 130I depend on the embodiment. Any data obtained from GNSS signal processing may be measured to obtain observable metrics. Examples of observable metrics that may be used as described herein, in some embodiments, include: Code Phase, Pseudorange, Pseudorange Rate, and Doppler. In certain embodiments, a pseudorange is determined as a difference between two times: received time (as measured by a receiver's clock)—transmit time (as measured by satellite's clock).

In some embodiments, a plurality of reference receivers 130A-130C (see FIG. 1C) may demodulate at least a specific signal broadcast by a specific SPS satellite e.g. SPS satellite 120A, to extract raw demodulated data therefrom. These multiple reference receivers then transmit the raw demodulated data to server 103, via a plurality of point-to-point communication sessions (e.g. point-to-point communication sessions 136A-136C). In several such embodiments, server 103 generates, for a specific SPS satellite 120A, a corresponding specific ephemeris, which is included in navigation data transmitted to mobile devices in a geographic region (e.g. cellular region) in which the specific SPS satellite 120A is visible, based on the raw demodulated data received from reference receivers 130A-130C.

In many embodiments, encrypted impairment SPS satellite data 140 which is transmitted by server 103 to a mobile device 110I (FIG. 1D) may be limited to SPS satellites that are (or soon will be) visible in a geographic region (e.g. cellular region 135I) in which the mobile device 110I is located, and may lack identifications of impairments in other geographic regions (e.g. cellular region 135M). Mobile device 110 of FIGS. 1A-1C described above can be any of mobile devices 110A . . . 110I . . . 110J . . . 110N shown in FIG. 1D. Moreover, cellular base station 134 shown in FIG. 1C and described above can be any of cellular base stations 134A . . . 134I . . . 134J . . . 134N shown in FIG. 1D. Similarly, impairment SPS satellite data 140 shown in FIG. 1C and described above can be impairment SPS satellite data 140I shown in FIG. 1D.

Figure 1D:
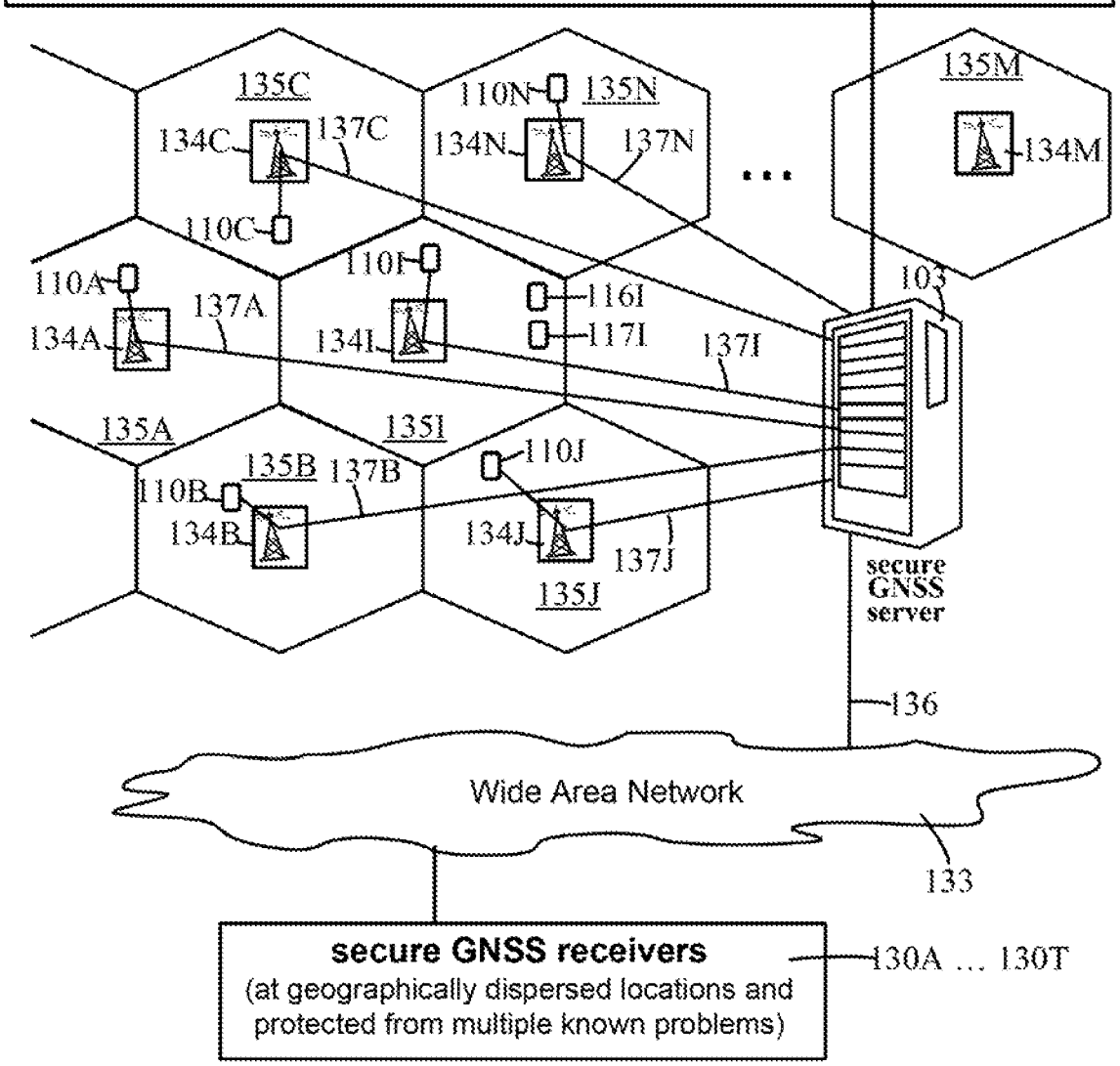
FIG. 1D illustrates, in some embodiments, server 103 of FIGS. 1A-1C transmitting N versions of impairment SPS satellite data and navigation data (not shown) to mobile devices 137A-137N, through corresponding cellular base stations 134A-134N that respectively service N geographic regions 135A-135N (also called "cellular regions") for which the N versions being transmitted are customized by server 103, based on visibility of satellite(s) and localized impairment of satellite signal(s).

As illustrated in FIG. 1D, server 103 may maintain in its memory 510, a table indexed by identifiers of cellular base stations (e.g. names of cities), and for each cellular base station the table may contain the following columns: SVs that are visible now, impaired SVs, and navigation data for unimpaired SVs. Hence, in such embodiments, a geographic region (for which navigation data and/or impairment SPS satellite data is localized) is identified at, least partially based on a location of a cellular base station 134I (which includes a wireless transmitter) currently in communication with a mobile device 110I, and through which mobile device 110I forms a point-to-point communication session 137I with server 103.

Hence, in embodiments of the type shown in FIG. 1D, mobile device 110I may receive, via the above-described point-to-point communication session 137I, navigation data (e g. in the first row of the table in memory 510) which includes specific ephemeris of one or more specific SPS satellites (e.g. SVs 2, 3, 4, 5, 6, 7) that are visible in the cellular region 135I (in which mobile device 110I is currently located), and lacks ephemeris of other satellites (e.g. SVs 21, 22, 23, 23, 17) visible in other geographic regions (e.g. cellular region 135M). Depending on the embodiment, the navigation data may include or exclude, ephemeris of SPS satellites (e.g. SV 1) that may be visible in cellular region 135I but currently identified as impaired (e.g. from 1 to 2 pm, in cellular region San Jose). Depending on the embodiment, server 103 may or may not identify impairment of SVs in impairment SPS satellite data sent to mobile device 110, as being localized in time, e.g. by identifying a specific start time and end time (or duration from start time), during which each satellite is identified as impaired (in a cellular region 135I).

Based on the navigation data localized for a cellular region (e.g. as shown in the right-most column of the table in memory 510 in FIG. 1D), mobile device 110I or server 103 (depending on the embodiment), uses observable metrics of signals received from SPS satellites visible in the cellular region to determine pseudoranges to the SPS satellites that are known to be unimpaired. Depending on the embodiment, SVs may be directly identified as unimpaired, e.g. by a listing of unimpaired SVs which may be included in impairment SPS satellite data 140, or alternatively SVs may be indirectly identified as unimpaired by subtraction of a listing of impaired SVs included in impairment SPS satellite data 140 from a listing of visible SVs. In several such embodiments, the position of a mobile device 110I may be determined based at least partially on pseudoranges to unimpaired SPS satellites (e.g. SVs 2, 3, 4, 5, 6, 7 shown in the first row of a table illustrated in FIG. 1D), and ephemeris (included in navigation data) of the same unimpaired SPS satellites (e.g. SVs 2, 3, 4, 5, 6, 7).

Figure 1E:
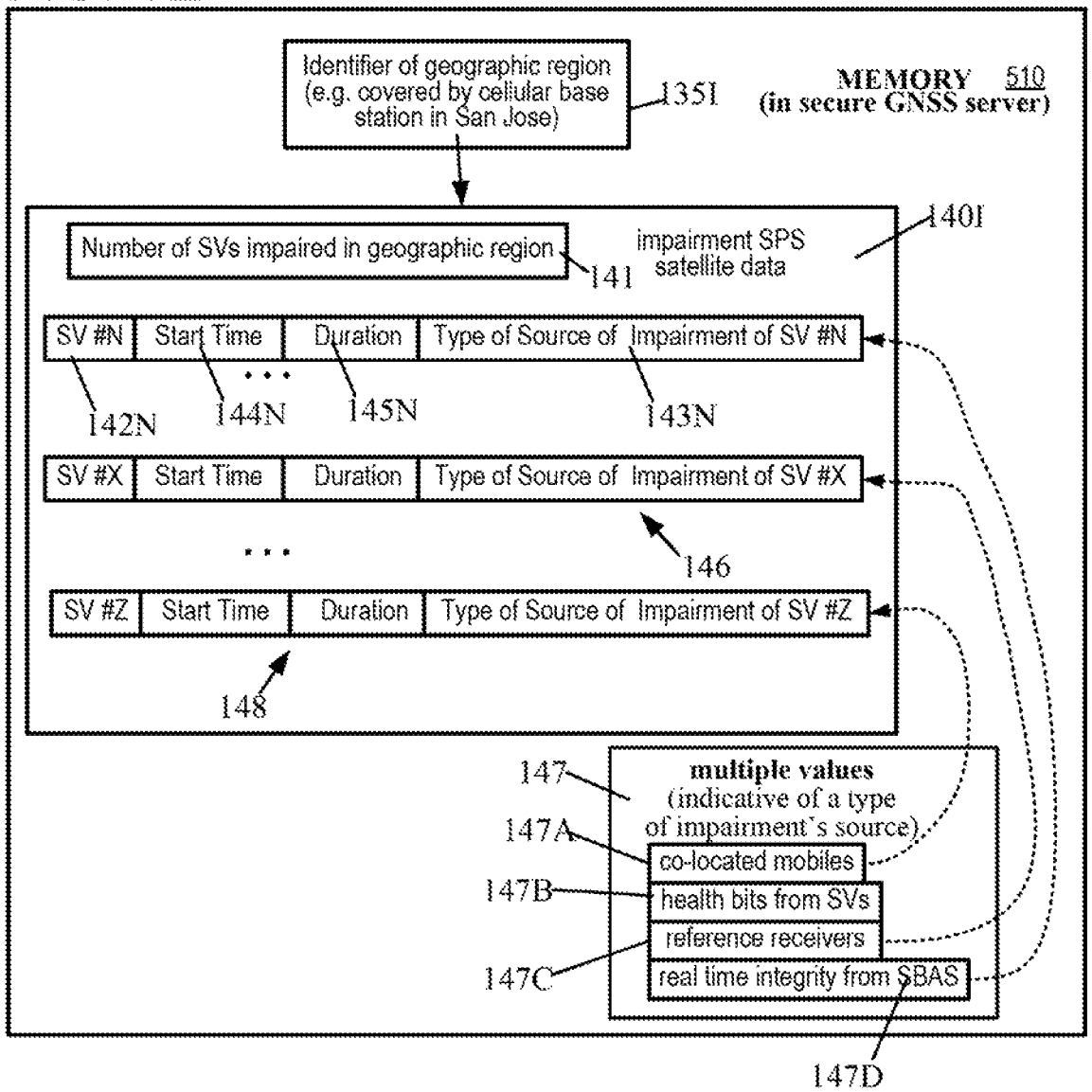
FIG. 1F illustrates, a data structure included in impairment SPS satellite data sent from server 103 to mobile device 110 in some embodiments of the type shown in FIGS. 1A-1C.

Note that impairment SPS satellite data 140 described above can be, for example, impairment SPS satellite data 140I for a cellular region 135I as illustrated in FIG. 1E. Specifically, in certain embodiments, server 103 stores in its memory 510 (FIG. 1E), impairment SPS satellite data 140I for each cellular region 135I (FIG. 1D), in which a cellular base station 134I is currently in communication with a mobile device 110I. In the just-described embodiments, server 103 includes in impairment SPS satellite data 140I, a count 141 (FIG. 1E) of how many SPS satellites (also called SVs) are impaired in cellular region 135I (FIG. 1D). In addition, server 103 includes in impairment SPS satellite data 140I, as many impairment records as the value of count 141, one for each impaired SV. As illustrated in FIG. 1E, an impairment record may include an identifier 142N of impaired SV # N, a start time 114N which indicates when the impairment begins, a duration 145N which indicates for how long the impairment occurs, and a type 143N of the source of impairment information.

Specifically, server 103 assigns to type 143N, one of multiple predetermined values 147 (FIG. 1E), which in some embodiments can be binary values. In the embodiment illustrated in FIG. 1E the type 143N is assigned a value 147D indicative of real time integrity identification received from an augmentation system (such as SBAS). The just-described value 147D is selected by server 103, in the embodiment illustrated in FIG. 1E from among four values: a first value 147A indicative of co-located mobiles, a second value 147B indicative of health bits from SVs, a third value 147C indicative of reference receivers, and a fourth value 147D indicative of real time integrity from an augmentation system (e.g. SBAS), based on where did server 103 receive information indicative of impairment of SV # N.

In some embodiments, the above-described first value 147A for the type 143N of the impairment's source is based on harvesting performed by server 103 in operation 323 (see FIG. 3B), and in such embodiments SVs that are identified as impaired by this harvesting are subjected to testing (e.g. see act 427 in FIG. 4B) in mobile device 110I and only when continued as unimpaired, then an observable metric of a signal from the SV is used in position determination in operation 233 (see FIG. 2A). In the just-described embodiments, the above-described second value 147B, third value 147C, and fourth value 147D, for the type 143N of the impairment's source is determined directly by server 103, e.g. in operation 321, or in operation 324 or in operation 325 (FIG. 3B). Therefore, in several such embodiments, position determination in mobile device 110 may be performed by unconditionally not using observational metrics from SPS satellites that are identified as impaired by server 103 unless impairment of an SPS satellite 120N is identified in sever 103 by harvesting of measurements from co-located mobile devices 116I, 117I in which case any measurement in mobile device 110I of a signal from SPS satellite 120N is subjected to additional tests, e.g. by use of a threshold (see act 427, described below in reference to FIG. 4B), which threshold is automatically changed in some embodiments, depending on the type of source of impairment (of SPS satellite 120N, e.g. if the value is 147A as shown in FIG. 1E).

In the embodiment shown in FIG. 1E, another satellite SV # X is identified by server 103 as impaired (in impairment SPS satellite data 140I), based on information received from reference receivers 130A-130N, as indicated by third value 147C assigned by server 103 to the type of impairment's source for this satellite SV # X in record 146. In still another example shown in FIG. 1E, yet another satellite SV # Z, is identified by server 103 as impaired (in impairment SPS satellite data 140O, based on information received from co-located mobiles 116I and 117I (FIG. 1D), as indicated by first value 147A assigned by server 103 to the type of impairment's source for this satellite SV # Z in record 148.

In some embodiments, N mobiles devices 11A, 110B . . . 110I . . . 110N transmit multiple sets of observable metrics to server 103 via corresponding N point-to-point communication sessions. In addition, using the same (or in some embodiments different) N multiple point-to-point communication sessions, the N mobiles devices 11A, 110B . . . 110I . . . 110N may additionally transmit to server 403, identifiers of SPS satellites identified as impaired, multiple subsets of satellites, e.g. N subsets of satellites that are internally found by the N mobiles devices to fail corresponding N RAIM techniques. Thus, the N subsets of satellites marked as impaired are selected from among corresponding N sets of satellites visible to the N mobiles devices 11A, 110B . . . 110I . . . 110N located in the N geographic regions. Hence, in such embodiments, in each subset in one or more SPS satellite(s) 120N (FIG. 1B) may be identified as impaired, by a mobile device 110I (also referred to as mobile device 110 in FIG. 1B), by identification of the impairment due to RAIM failure in mobile device 110I, with the just-described identification being done in mobile device 110I from among a respective set of satellites 120A-120N (FIG. 1B) that are visible to mobile device 110I in the corresponding geographic region (e.g. cellular region 135I).

Although four predetermined values 147 are illustrated for the impairment source's type, in the embodiment shown in FIG. 1E, in other embodiments, a type 143N may be assigned one of only two values (e.g. binary values) as noted above, wherein a first binary value (e.g. value 0) denotes the type of impairment source to be co-located mobiles, and a second binary value (e.g. value 1) denotes the type of impairment source to be any other source (such as health bits from SVs, reference receivers, and real time integrity from an augmentation system). In embodiments that assign a binary value to the type of impairment source, a mobile device 110I that receives impairment SPS satellite data 140I may still use the value received for a satellite SV # Z in record 148, to determine whether or not to perform additional tests in act operation (FIG. 2B) on signals received from SV # Z (as described below, in reference to FIG. 2B), in order to decide whether or not observable metrics of signals from SV # Z may be used in position determination in operation 233 (also described below).

In some embodiments that use multiple predetermined values 147 (e.g. as described in the preceding three paragraphs above), server 103 prepares impairment SPS satellite data 140I by combining information from multiple sources, all of which are external to mobile device 110I (FIG. 1D). Server 103 sends impairment SPS satellite data 140I to mobile device 110I after encryption, via a point-to-point connection 137I (FIG. 1D). In addition to sending impairment SPS satellite data 140I, server 103 additionally sends navigation data 108 (FIG. 1F) to mobile device 110I, e.g. via the same point-to-point connection 137I (FIG. 1D). In some embodiments, navigation data 108 includes a count of how many SPS satellites (also called SVs) are visible in cellular region 135I (FIG. 1D), followed by a corresponding number of navigation records. Each navigation record includes an identifier 152A of a SV # A, and ephemeris data 153A of SV # A.

In some embodiments, server 103 prepares navigation data to include demodulated data received from SPS satellites via reference receivers 130A-130T described above, and in addition further include extended ephemeris data. In several embodiments, the extended ephemeris data is prepared based on predictions that are valid for many days (typically 7 days, but can be as along as 31 days). Depending on the embodiment, the just-described predictions and/or extended ephemeris data may be generated internally by computations performed within server 103, or received from a third party computer, such as a computer of a vendor (for example Rx Networks).

In addition, in certain embodiments, receivers 130A-130I and optionally mobile devices 110A-110N may acquire and track one or more impaired SPS satellites, such as SPS satellite 120N (FIG. 1B), in addition to acquiring and tracking unimpaired SPS satellites 120A-120M (FIG. 1B) even though observable metrics measured from and data demodulated (e.g. ephemeris) from signals transmitted by the impaired SPS satellite 120N may be not used in position determination. Instead, such data from the impaired SPS satellite 120N may be used for Cross Correlation detection etc. Accordingly, in some embodiments, receivers 130A-130T and optionally mobile devices 110A-110N may obtain ephemeris by demodulating signals from all visible SPS satellites (e.g., 120A-120M and 120N in FIG. 1B), which then enables a server 103 to quickly find all SPS satellites in one or more geographic regions, such as cellular regions 130A-130I (FIG. 1C), in some embodiments, navigation data 108a which is prepared by server 103 and transmitted to mobile device 110 may contain ephemeris and other such data which is limited to only those SPS satellites that determined by server 103 to be visible (or soon to be visible, e.g. within an hour) in a geographic region in which mobile device 110 is currently located. In alternative embodiments, the navigation data 108a may be prepared by server 103 and transmitted to mobile device 110 to contain ephemeris and other such data not limited to only visible SPS satellites, (e.g. include ephemeris and other such data for all SPS satellites in a constellation).

In some embodiments, a geographic region may be small, e.g. a cellular region 135I (FIG. 1D) on the order of a few kilometers around a cellular base station 134I containing a wireless transceiver 107 (FIG. 1C) that is in communication with a wireless receiver 118 in mobile device 110 in FIG. 1C (also referred to as mobile device 110OI in FIG. 1D), in other such embodiments, a geographic region may be large, e.g. on the order of the size of an area code of a telephone number, or even larger, on the order of the size of a country itself (e.g. in Europe), or even on the order of the size of a continent, depending on the embodiment.

In some embodiments, mobile device 110 includes client software (also called "secure GNSS client") 112 that in turn includes registration logic 210 (FIG. 2A), communication interface 220 (e.g. implemented in software comprising instructions), and positioning engine 230 (e.g. implemented in software comprising instructions). Registration logic 210 (FIG. 2) responds to receipt of credentials (which may be received from a user 101 as described above in reference to FIG. 1A) by using these credentials to perform operation 211 (FIG. 2A) to create a point-to-point communication session 105 (with server 103), followed by operation 212 (FIG. 2A) in which secure GNSS client 112 is authenticated, e.g. by use of keys and/or certificates, depending on the embodiment.

After successful authentication in operation 212 (FIG. 2A), registration logic 210 invokes operation of communication interface 220. In certain embodiments, communication interface 220 (FIG. 2A) performs one or more operations, such as operation 221 (FIG. 2A) to receive securely from server 103, via the point-to-point communication session 105, encrypted impairment SPS satellite data 140I (FIG. 1E). The encrypted impairment SPS satellite data 140I contains identification of impairment of satellite(s), e.g. identifiers of impaired SVs (or in alternative embodiments, identifiers of unimpaired SVs). In some aspects, impairment SPS satellite data 140I is regionalized (regardless of whether impaired SVs are identified or unimpaired SVs are identified therein) to contain identifiers of only those SVs that are visible in a geographic region (e.g. a cellular region), in which mobile device 110 is currently located. Receipt of impairment SPS satellite data 140I which is regionalized enables mobile device 110I to obtain a position fix faster, because extraneous impairment information relevant to other geographic regions (e.g. cellular regions 135A, 135B . . . 135J, and 135M, see FIG. 1D), is not currently needed in mobile device 110I is deliberately excluded.

In operation 222 (FIG. 2A), communication interface 220 decrypts the received impairment SPS satellite data 140, to obtain identifiers of impaired SVs (or in alternative embodiments, identifiers of unimpaired SVs). As noted above in reference to FIG. 1F, identifier(s) of one or more impaired or unimpaired SPS satellite(s) (which are obtained by decryption in operation 222) were included in impairment SPS satellite data 140I by server 103 combining information from multiple sources, all of which are external to mobile device 110I (FIG. 1D).

In some embodiments, a list of identifiers of impaired SVs (or a list of unimpaired SVs in the alternative embodiments) obtained by performing the operation 221 (FIG. 2A), may be supplied by a processor 405 (FIG. 5A) in mobile device 110 to an input port of a GNSS receiver 111 (see FIGS. 2A and 5A) that contains a filter (e.g. in hardware). The just-described filter in GNSS receiver 111 may be designed to exclude generation of observable metrics (e.g. pseudoranges) from signals of SVs that are impaired, in other embodiments, another such GNSS receiver 271 (FIG. 2B) may not have an input port to accept identifiers of SVs that are impaired (or unimpaired SVs in the alternative embodiments), because GNSS receiver 271 does not have the just-described filter, to exclude SVs (see FIG. 2B), in which case identifiers of impaired SVs (or unimpaired SVs in the alternative embodiments) may be stored by operation 223 (FIG. 2B), which is performed by mobile device 110, in a storage device 251 (FIG. 2B) that is accessible to positioning engine 230 for future use therein, e.g. to discard in operation 252 (see FIG. 2D, described below) any impaired data that may be generated by GNSS receiver 271.

Figure 2B:
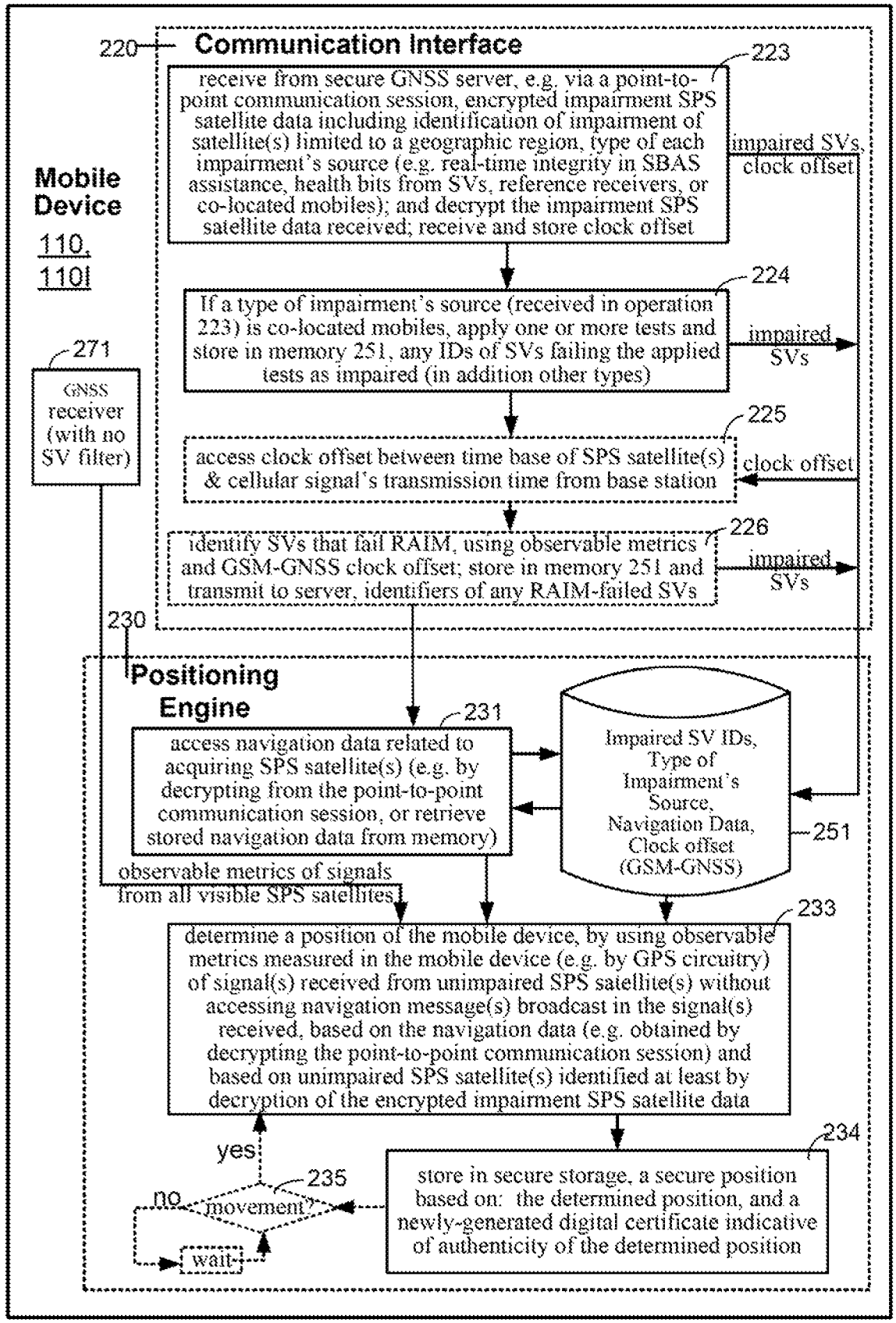
FIG. 2B illustrates, in another high-level flow chart, other embodiments that perform some operations similar to (or identical to) those shown in FIG. 2A, and in addition perform one or more other operations.
Figure 2E:
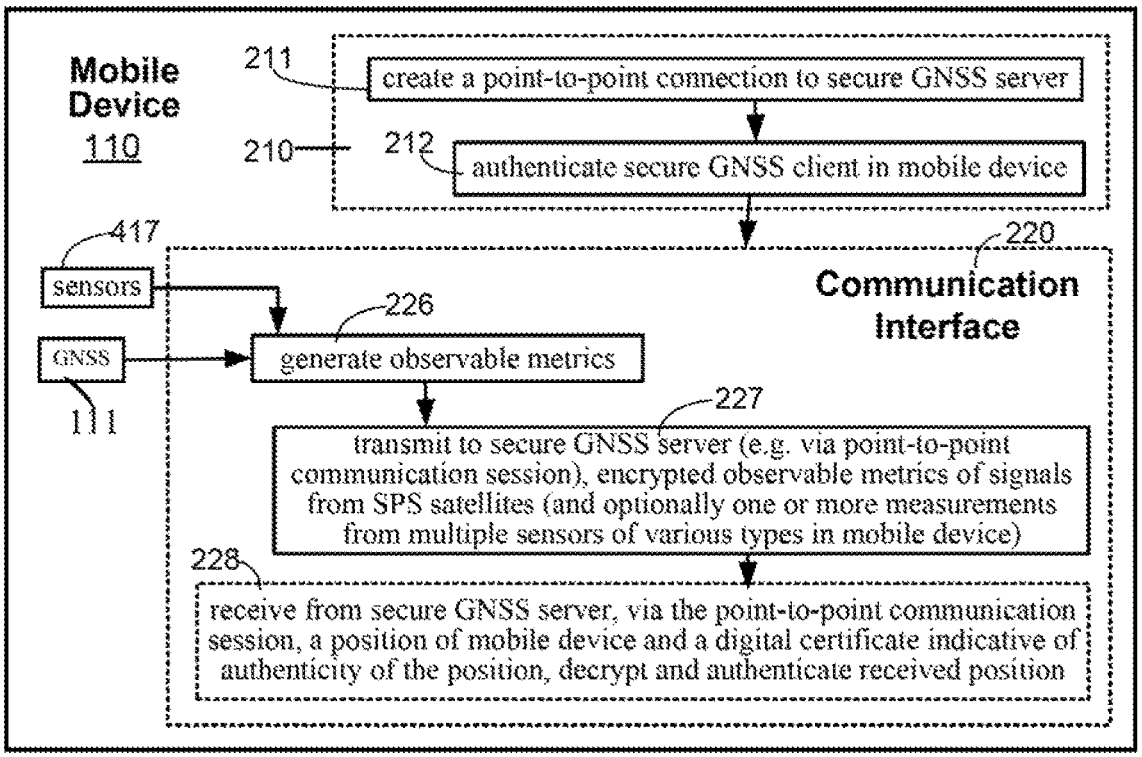
FIG. 2E illustrates, in a high-level flow chart, certain embodiments in which some operations may be performed in mobile device 110 to transmit a set of observable metrics of satellite signals) to server 103, for position determination therein, and from which the determined position is received by mobile device 110.

In certain embodiments, positioning engine 230 (FIG. 2A) performs one or more operations, such as operation 231 to access navigation data, and thereafter operation 233 to determine a new position of the mobile device, followed by operation 234 to store the new position with a digital certificate indicative of authenticity of the new position, a discussed below. Specifically, in operation 231, positioning engine 230 accesses the navigation data 108 (FIG. 1A), e.g. by retrieval from a memory 401 (FIG. 5A) of mobile device 110 or from a storage device 251 (FIG. 2B). In some alternative embodiments, operation 233 may be implemented by receipt and decryption of navigation data in mobile device 110, from a point-to-point communication session with server 103. Hence, in some embodiments, a common point-to-point communication session 105 is used to securely receive (via cellular circuitry within mobile device 110 that is wirelessly connected to wireless transmitter 107) both encrypted impairment SPS satellite data and navigation data. In some embodiments, both the just-described data in the preceding sentence may be limited by server 103 to a geographic region (e.g. a cellular region), in which mobile device 110 is currently located.

In operation 233 (FIG. 2A), positioning engine 230 (FIG. 2A) determines a position of the mobile device 110, by using observable metrics (e.g. pseudoranges) measured in mobile device 110 (e.g. by GNSS receiver 111) of signal(s) 121A-121M (see FIG. 1B) received from unimpaired SPS satellite(s) 120A-120M without accessing navigation message(s) broadcast in the signal(s) 121A-121M which are received in mobile device 110, based on accessed navigation data (e.g. obtained from memory, or by decrypting the point-to-point communication session 105) and based on unimpaired SPS satellite(s) 120A-120M identified by decryption of encrypted impairment SPS satellite data (e.g. also obtained by decrypting the point-to-point communication session 105).

Some embodiments of operation 233 (FIG. 2A) receives from GNSS receiver 111 only observable metrics of signals 121A-121M from SPS satellites 120A-120M identified as unimpaired. In such embodiments, operation 233 may be implemented, by performing one or more acts 241-246 illustrated in FIG. 2C. However, in alternative embodiments, operation 233 may receive from GNSS receiver 271 observable metrics of all signals 121A-121N (which include all visible SPS satellites 120A-120N, which includes impaired SPS satellite 120N) as shown in FIG. 2B. In these alternative embodiments, operation 233 may be implemented as shown in FIG. 2), by performing one or more acts 241-246 (which are identical to these same acts shown in FIG. 2C), and in addition performing acts 261, 262 (see FIG. 2D) to process observable metrics of signal 121N from impaired satellite 120N to obtain a new position 114 (FIG. 1B) of mobile device 110, as discussed below.

On completion of operation 233, positioning engine 230 may perform a storage operation 234 (FIG. 2A), wherein a new position 114 of mobile device 110 is Stored securely in secure storage 113 (which may be implemented in, memory 401 of mobile device 110), in association with a new certificate 115 that is indicative of authenticity of new position 114. In some embodiments, secure storage 113 is implemented by a processor programmed with software comprising instructions to generate a checksum for each piece of data being stored by storage operation 234, e.g. a first checksum for the new position 114 and a second checksum for the new certificate, and these two checksums are stored in a storage location that is normally inaccessible (e.g. inaccessible to positioning engine 230), e.g. accessible only to the operating system.

Although the just-described storage operation 234 is performed in mobile device 110 of some embodiments, in other embodiments this storage operation 234 may be performed by server 103, or storage operation 234 may be performed by both, depending on the embodiment. Accordingly, a processor programmed with software to generate one Of more checksum(s) as described in the preceding paragraph above may be included in either mobile device 110 or in server 103 or in both, depending on the embodiment. Moreover, in some embodiments, such a processor programmed with software to generate checksums) may be used to implement a means for storing in secure storage, based on memory and/or a storage device in combination with an operating system, to make the checksum(s) inaccessible outside the operating system.

In some embodiments, storage operation 234 protects the data being stored from unauthorized access and/or dissemination, whether accidental or deliberate. By way of an example, new position 114 of mobile device 110 is protected data. As another example, observable metrics (e.g. pseudoranges) generated by mobile device 110 are protected data. As yet another example, impairment SPS satellite data 140 are also protected data. All such protected data may be stored securely in some embodiments, by use of checksums as described in the preceding paragraph above. Various methods and apparatuses may be provided, e,e. as described in US Publication 2014/0351886, to implement protected storage of various types. The protected data may be transmitted directly or indirectly after encryption, between different electronic devices, such as server 103 and mobile device 110. Moreover, as noted herein, in certain implementations an authentication process may be performed to ensure that a particular mobile device 110 is authorized to obtain protected data directly or indirectly from a particular server 103. Here, for example, a certain protected data may be indicative of confidential (and possibly very precise) navigation data and/or ephemeris of one or more SPS satellites. In another example, in certain implementations an authorization process may be performed to insure that a particular server 103 is authorized to obtain protected data (e.g. observable metrics and/or position of a mobile device 11t) directly or indirectly from mobile device 110. Here, for example, certain protected data may be indicative of confidential location information regarding mobile device 110.

In some embodiments, communication interface 220 (FIG. 2B) may perform one or more additional operations, such as operation 223 (similar to above-described operations 221 and 222) to receive securely from wireless transmitter 107 and decrypt encrypted impairment SPS satellite data 140I. In several such embodiments, in operation 223, mobile device 110 stores in storage device 251 (which may be implemented, for example, as a hard disk or flash memory), identifiers of all satellites that are identified as impaired in impairment SPS satellite data 140I, specifically hen records corresponding thereto have any value in the type of impairment's source which is not same as "co-located mobiles" (e.g. any of values 147B, 147C and 147D in FIG. 1E).

When any record in impairment SPS satellite data 140I identifies a satellite SV # Z as impaired and the type of impairment's source is first value 147A indicating "co-located mobiles", then such satellites are tested further in operation 224. Specifically, in operation 224 (FIG. 2B), mobile device 110 applies one or more tests to signals received from satellite SV # Z, and if SV # Z is found to fail the one or more tests then mobile device 110 stores the identifier SV # Z in storage device 251 and marks it as impaired and unusable, so as to prevent use of observable metrics therefrom in position determination in operation 233. Depending on the embodiment, in addition to marking SAT 47 as impaired in storage device 251 mobile device 110 may notify the server 103, that SV # Z failed the one or more tests.

In some embodiments, impairment SPS satellite data 140 received in operation 223 (FIG. 2B) may optionally include a clock offset between a time base of the SPS and a cellular signal's transmission time from the base station, e.g. cellular base station 134 (FIG. 1C) which includes wireless transmitter 107. In alternative embodiments, the just-described clock offset may be generated within a cellular base station 134, based on another clock offset that is received therein (e.g. from server 103 or alternatively from wireless transmitter 107), which may be adjusted based on a start time of transmission of a cellular signal from wireless transmitter 107. In some of these alternative embodiments, a clock offset may originate in and be sent directly by wireless transmitter 107 to mobile device 110 (FIG. 2B), separately from impairment SPS satellite data 140. Regardless of how the clock offset is received in operation 223, mobile device 110 may store the clock offset in storage device 251 (FIG. 2B) and/or use it in an operation 225.

Specifically, in operation 225 (FIG. 2B) mobile device 110 access the clock offset and uses it internally to identify in operation 226, any SV that fails receiver autonomous integrity monitoring (RAIM) based on the received clock offset. The RAIM-failed SVs which are internally determined in operation 226 (FIG. 2B) may be transmitted to server 103 and optionally stored in storage device 251 for future use, e.g. to exclude observable metrics therefrom (e.g. pseudoranges), during position determination in operation 233.

Position determination operation 233 (which may be performed in mobile device 110 and/or in server 103 depending on the embodiment), includes one or more acts 241-246 illustrated in FIG. 2C, and described next. In act 241, positioning engine 230 may retrieve from memory, identities of one or more impaired SPS satellite(s) decrypted from encrypted data, and/or previously determined and stored locally (in mobile device 110). The just-described encrypted data may include, for example impairment SPS satellite data and/or navigation data, received securely via point-to-point connection 105. In some embodiments, the identities of impaired SPS satellite(s) which are retrieved in act 241 are used in act 242, to generate pseudoranges, based on observable metrics of signals from SPS satellite(s) identified as unimpaired. Hence, the pseudoranges generated in act 242 include unimpaired pseudorange(s) between mobile device 110 and unimpaired SPS satellites 120A-120M (see FIG. 1B). In some embodiments, in act 241, mobile device 110 may perform RAIM on the pseudoranges generated, to identify one or more SPS satellite(s) that are currently visible, as mobile-RAIM-failed based on, for example, outlier detection using observable metrics (and/or dock offset between GNSS time base and transmission time of signal at cellular station, as described above in reference to operation 226 in FIG. 2B).

In several embodiments, mobile device 110 (FIG. 2C) identifies unimpaired SPS satellites in act 242, for subsequent use in position determination. Specifically, in act 242 of certain embodiments, impairment SPS satellite data 140 includes one or more records containing identifiers of impaired satellites, and these satellites are subtracted from a list of visible satellites, to identify the unimpaired SPS satellites. In alternative embodiments, impairment SPS satellite data 140 may include records containing identifiers of unimpaired satellites, and these satellites are identified in act 242 as unimpaired SPS satellites. Thereafter, the unimpaired SPS satellites are used to generate pseudoranges thereto, for use in position determination, also in act 242.

In some embodiments, pseudoranges generated in act 242 (see FIG. 2C) may be subjected to act 243 that uses the pseudoranges in a receiver autonomous integrity monitoring (RAIM) technique to locally identify one or more additional SPS satellite(s) as impaired, and these impairment identifications may be securely transmitted to server 103 as mobile-RAIM-failed. An identifier SV # Z of a satellite that is identified as mobile-RAIM-failed in mobile device 110I (FIG. 2C) may be further checked by server 103 and thereafter identified as impaired, with the type of source being assigned the value "co-located mobile", and distributed to mobile devices 116I and 117I (FIG. 1D) that are currently physically located in the same geographic region (or cellular region 135I) as mobile device 110I.

In some embodiments, a RAIM technique used in act 243 (see FIG. 2C) in mobile device 110 may solve an over-constrained problem, for example, by obtaining five position-and-time solutions based on five combinations of four satellites, in a situation where five satellites are visible and identified as unimpaired. In this example, when there is a large error in pseudorange to one specific satellite, four solutions based on this specific satellite may be found to be similar to each other, and these four may differ significantly (e.g. more than 10%) from a fifth solution (which excludes this one specific satellite). In this case, the specific satellite is marked as mobile-RAIM-.failed (and the problem may be again solved, without this specific satellite's pseudorange which has been determined to be erroneous). Identity of a mobile-RAIM-failed satellite may be transmitted securely by mobile device 110 to server 103, via point-to-point communication session 105.

Instead of, or in addition to over-constraining by use of an extra satellite, other embodiments of a RAIM technique used in act 243 (see FIG. 2C) may receive as input, the above-described clock offset (between GNSS time base and GSM signal's transmission time from cellular base station 134), previously stored in storage device 251 (see FIG. 2B). Thus, the clock offset may be used, to mark a specific satellite as mobile-RAIM-failed, in some embodiments of act 243. Hence, depending on the embodiment, the just-described clock offset (also referred to as GSM-GNSS clock offset) may be additionally or alternatively used, with observable metrics generated in mobile device 110 (which in turn are used to calculate unimpaired pseudoranges), to ascertain a position in act 245 of each unimpaired SPS satellite that is visible (based on ephemeris of the unimpaired SPS satellite and observable metrics of a signal therefrom, pseudorange thereto).

Some embodiments of a RAIM technique used in act 243 (see FIG. 2C) in mobile device 110 may receive as input, one or more sensor measurements, e.g. an indication of the current state of mobile device 110 as being either stationary or moving, as may be output by a motion sensor (which may be one of sensors 417 in mobile device 110, shown in FIG.

5A). In several embodiments, input for RAIM technique used in act 243 may include (instead of or in addition to the stationary or moving current state of mobile device 110), other data which may be indicative of terrestrial position and/or speed of mobile device 110, e.g. output of position computation within mobile device 110, based on measurements or metrics of other types of wireless signals, such as a WiFi signal which may indicate a rough position of mobile device 110, e.g. within a few hundred meters (instead of a few meters, or a few feet based on use of GPS signals).

In certain embodiments of the type just described, the stationary state of mobile device 110 (see FIG. 2C) is used with concurrently-determined position (e.g. in a prior iteration of act 246 and/or subsequent iteration of act 246) to identify a specific satellite as "mobile-sourced" impaired if a triangulation solution based on observable metrics of a signal transmitted by the specific satellite (e.g. pseudorange indicates that mobile device 110 is moving (e.g. by comparison of positions output by the just-described two iterations of act 246).

Some embodiments perform act 243 (which applies one or more RAIM techniques) prior to act 242 (which generates a plurality of pseudoranges), so that the pseudoranges generated are known to be unimpaired, and hence may be used directly in act 244 (see FIG. 2C), described below. In alternative embodiments, pseudoranges may be generated (e.g. in act 261 in FIG. 2D) based on observable metrics of signals from impaired SPS satellites (which may be in addition to the above-described act 242 for unimpaired SPS satellites, or such pseudorange generation may be without distinction between impaired and unimpaired). In the just-described alternative embodiments, positioning engine 230 may perform an act 262 (FIG. 2D) to discard the pseudoranges of signals from SPS satellites that are identified as impaired (regardless of whether the identification of impairment originated in the server 103, or locally within mobile device 110).

Thus, in the just-described position determination operation 233, based on SPS satellite(s) 120N being known to be impaired (e.g. from the encrypted impairment SPS satellite data), one or more impaired pseudorange(s) to the impaired satellite(s) 120N may be either not generated during pseudorange generation in act 242, or are generated in act 261 (FIG. 2D) but are programmatically excluded (by being discarded in act 262 by execution of software) from usage in position determination. Hence, on completion of act 242 and on entering the act 243 (in FIGS. 2C and 2D), unimpaired pseudorange(s) between mobile device 110 and unimpaired SPS satellite(s) 120A-120M (see FIG. 1B) are generated, which improves accuracy of the 244-246 (described below), in position determination operation 233.

In some embodiments, positioning engine 230 in mobile device 110 performs acts 244-246 in a normal manner, to determine position of mobile device 110 in three coordinates (x, y, z) and an offset t of an internal clock within mobile device 110. Specifically, in act 244, positioning engine 230 applies to unimpaired pseudoranges received from act 242, one or more corrections, such as corrections for clock offset, relativistic effects, ionospheric signal propagation delays, which mobile device 110 may receive securely from server 103, via point-to-point communication session 105.

In some embodiments, after operation of registration logic 210, mobile device 110 may perform in communication interface 220, one or more operations 226, 227 and/or 228 (FIG. 2E) in addition to (or in some embodiments instead of) operations 221 and 222 (FIG. 2A) and/or 223-226 (FIG. 2B). Specifically, in operation 226, communication interface 220 in mobile device 110 generates observable metrics of satellite signals (e.g. pseudoranges) directly or indirectly by operation of GNSS receiver 111, and optionally one or more measurements from multiple sensors of various types in mobile device 110, such as a motion detector, a camera, and a microphone. Operation 226 (FIG. 2E) is followed by operation 227 in which a point-to-point communication session is used by communication interface 220 to transmit to server 103, encrypted observable metrics of signals from SPS satellites, and/or sensor measurements. The just-described point-to-point communication session which is used in operation 227 may be same or different (depending on the embodiment) from a point-to-point communication session 105 over which encrypted impairment SPS satellite data may (or may not) have been received by mobile device 110 from server 103, e.g. in operation 221 (FIG. 2A) or operation 223 (FIG. 2B).

In embodiments of the type described in the preceding paragraph, in an operation 252 (FIG. 2F), server 103 receives the encrypted observable metrics of satellite signals (and optionally the sensor measurement(s)), decrypts the received data (including the observable metrics (e.g. pseudoranges), and the sensor measurements), and discards certain observable metrics that are of signals from satellites identified as impaired. Then, in operation 253 (FIG. 2F), server 103 determines a position of mobile device 110 by using observable metrics (e.g. pseudoranges) measured in mobile device 110 of signal(s) received from unimpaired SPS satellite(s) without accessing navigation message(s) broadcast in the signal(s) received.

Figure 2F:
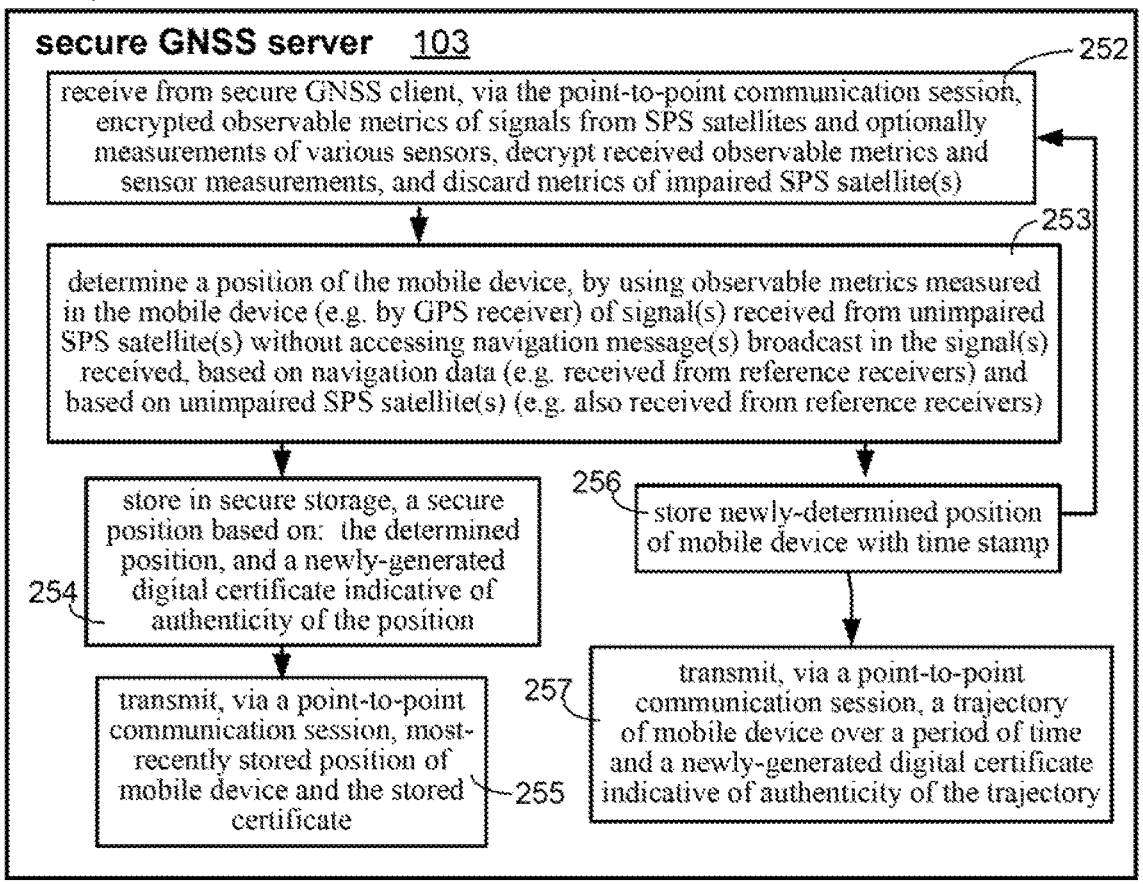
FIG. 2F illustrates, in a high-level flow chart, in embodiments that include a mobile device 110 of the type shown in FIG. 2E, some operations that may be performed in serves 103 to determine a position of mobile device 110, and store the determined position(s) securely (and in some cases repeated periodically, to generate a trajectory of mobile device 110 that is stored securely).

Server 103 may perform operation 253 of FIG. 2F in addition to or as an alternative to mobile device's own position determination operation 233 of FIG. 2A. Operation 253 performed by server 103 may be based on navigation data (e.g. received from reference receivers), and based on unimpaired SPS satellite(s) (e.g. also received from reference receivers), in addition to a set of observable metrics of satellite signals measured in and received from mobile device 110. Hence, operation 253 in server 103 may be performed in a manner similar (or in some cases, identical) to operation 233 described above in reference to FIG. 2A, for a mobile device's own position determination. For an illustrative implementation of operations 233 and 253, see FIG. 4A, described below. Depending on the embodiment, operation 253 in server 103 (FIG. 2E) may differ from operation 233 in mobile device 110 (FIG. 2A), e.g. due to certain sensors' measurements being available in mobile device 110 but not in server 103, and/or due to observable metrics of satellite signals measured in other mobile devices being available in server 103 but not in mobile device 110.

On completion of operation 253, server 103 may perform operation 254 of FIG. 2F, to store in secure storage (e.g. in memory 510), a secure position based on: mobile device's position determined in operation 233, and a newly-.generated digital certificate that is indicative of authenticity of the position. Thereafter, server 103 may perform an operation 235 (FIG. 2F) to transmit to mobile device 110, via a point-to-point communication Session, in encrypted form, the just-described position and the certificate. Mobile device 110 then performs operation 228 (FIG. 2E), to, receive the position (and the digital certificate) in encrypted form from server 103, decrypts the received position and authenticates it using the received certificate.

In some embodiments, instead of (or in addition to) operations 254 and 255, server 103 may be programmed to perform one or more of operations 256 and 257 (FIG. 2F). Specifically, in operation 256, server 103 simply stores a newly-determined position of mobile device 110 with a time stamp which is indicative of a time at which mobile device 110 measured the observable metrics used in position determination. After operation 256, server 103 returns to operation 252 (FIG. 2F). After performance of operation 253 and 256 (FIG. 2F) repeatedly for a predetermined number of times (or for a predetermined duration, e.g. 1 hour), server 103 performs operation 257(FIG. 2F) wherein server 103 prepares a trajectory of mobile device 110 based on the stored positions (over the predetermined duration), and creates a certificate to indicate authenticity of the trajectory, and then securely transmits the trajectory with the certificate in encrypted form, over a point-to-point connection, e.g. to mobile device 110 and/or to a third party requester.

In some embodiments of the type illustrated in FIG. 1C, reference receivers 130A-130T at locations geographically dispersed from one another, generate observable metrics and raw demodulated data from signals that are received from SPS satellites 120A-120Z, as shown by act 312 (FIG. 3A). Act 312 is followed by act 313 (FIG. 3A) in which reference receivers 130A-130T transmit the observable metrics and demodulated data, via a plurality of pint-to-point communication sessions 136A-136T (collectively referred to as point-to-point connections 136) to server 103 (FIG. 1C). Each of reference receivers 130A-130T also performs an act 311 to execute anti-virus, anti-malware and/or other anti-hacking software before, after, between, and concurrently with (in a time shared manner), acts 311 and 312 described above. By performance of act 311, reference receivers 130A-130T are protected from multiple known problems, e.g. various types of viruses, malware attacks, and remote administration technologies (RATs).

In embodiments of the type described in the preceding paragraph, server 103 may be programmed with software to perform one or more of operations 321-326 (FIG. 3B) as follows. In operation 321, server 103 accesses from memory 510, observable metrics 514 stored therein, which were previously received from reference receivers 130A-130T (T in number), via a plurality of point-to-point communication sessions 136A-136T (also T in number), after measurement of satellite signals by receivers 130A-130T (see act 313 in FIG. 3A). In operation 321, server 103 applies a global integrity monitoring technique to the T sets of observable metrics (e.g. pseudoranges) from the T reference receivers, to mark as impaired N subsets of satellites (e.g. one or more impaired satellites in each subset). Impaired satellites identified in each subset by server 103 are selected respectively from among N sets of satellites (e.g. six to eight satellites in each set) that are visible in corresponding N geographic regions (e.g. N cellular regions, such as cellular regions 135A-135N shown in FIG. 1D). In addition to identifying impaired satellites, in some embodiments, server 103 also identifies (and stores in memory 510), a type of source of impairment, for each impaired satellite and a third value 147C (FIG. 1E) for this type (as "reference receivers") is automatically selected by server 103 as described above. A global integrity monitoring technique, which is used by server 103 in operation 321, may be implemented in some embodiments, as described below in reference to FIG. 4D.

Figure 1F:
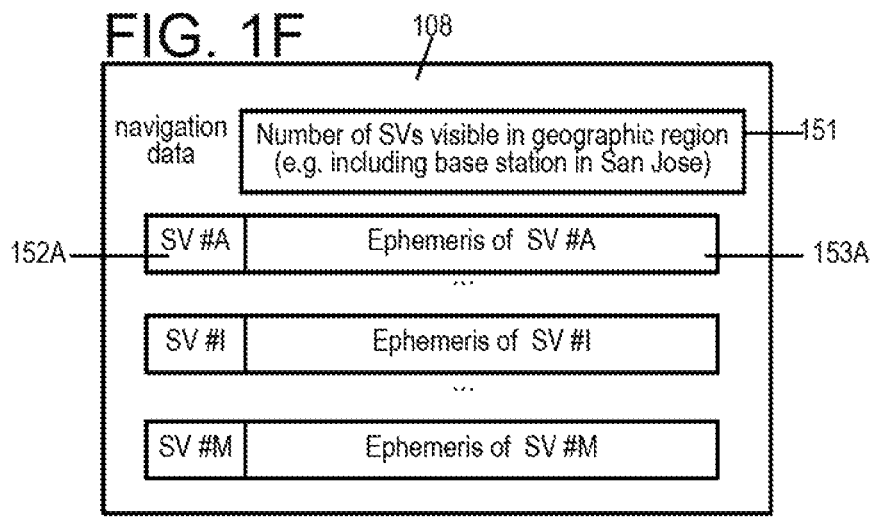

Then, server 103 may perform an operation 322 (FIG. 3B), by selecting from among these N subsets of impaired satellites, a specific subset I that corresponds to a cellular region 135I where a mobile device 110I is located, to prepare one or more records in impairment SPS satellite data 140I shown in FIG. 1F, for future use, specifically in transmission (in operation 326, described below), via a point-to-point communication session 137I to mobile device 110I. In preparing the records in impairment SPS satellite data 140I, server 103 may optionally include (depending on the embodiment), identification of the type of impairment's source (e.g. third value 147C) for each impaired satellite. Also depending on the embodiment, in operation 322, server 103 may optionally further include a start time and duration (or end time) of impairment, in each record in impairment SPS satellite data 140I.

In some embodiments, server 103 may be programmed with software to perform an operation 323 to repeatedly apply a regional integrity monitoring technique as follows. Specifically, in operation 323 (FIG. 3B), server 103 accesses from memory 510, multiple sets of observable metrics 515I stored therein, which were previously received from corresponding multiple mobile devices 110I, 116I and 117I located in cellular region 135I (see FIG. 1D), via corresponding multiple point-to-point communication sessions, such as point-to-point communication session 137I (which is just one of the multiple individual sessions with respective multiple mobile devices), after measurement of satellite signals by the mobile devices 110I, 116I and 117I (see operation 227 in FIG. 2E). In operation 323, server 103 applies a regional integrity monitoring technique to the multiple sets of observable metrics 515I from the multiple mobile devices 110I, 116I and 117I, to mark one or more satellites currently visible in cellular region 135I as impaired. In addition to identifying impaired satellites, in some embodiments, server 103 also identifies (and stores in memory 510), a type of source of impairment, for each impaired satellite and a first value 147A (FIG. 1E) for this type (as "co-located mobiles") is automatically selected by server 103 as described above. A regional integrity monitoring technique, which is used by server 103 in operation 323, may be implemented in some embodiments, as described below in reference to FIG. 4C. Operation 323 may be performed repeatedly, to iterate over each cellular region 135I from which at least one mobile device 110I establishes a point-to-point session with server 103.

In embodiments of the type described in the preceding paragraph, server 103 may additionally perform an operation 324 (FIG. 3B) iteratively for each cellular region 135I, by combining into impairment SN satellite data 140I which is currently stored in memory 510 (see operation 322) for a cellular region 135I, one or more newly-created records that are prepared using identifiers of one or more satellite(s) identified as impaired by regional integrity monitoring in operation 323. In doing so, as noted above in reference to operation 322, server 103 may optionally include identification of type of impairment's source (e.g. first value 147A), for each impaired satellite and optionally a start time and duration (or end time) of impairment.

In certain embodiments, server 103 performs an operation 325 (FIG. 3B) to combine into impairment SPS satellite data 140I stored (see operations 322 and 324) for cellular region 135I, (in which mobile device 110I is located), one or more newly-created records that are prepared using identifiers of one or more satellite(s) identified as impaired by real time integrity in assistance information from augmented systems (e.g. SBAS), or in health bits from SVs, which information is previously received, and stored in memory 510. In doing so, as noted above in reference to operation 322, server 103 may optionally include identification of type of impairment's source (e.g. second value 147B or fourth value 147D), for each impaired satellite and optionally a start time and duration (or end time) of impairment.

In an operation 326, after a point-to-point connection is set up with a mobile device 110I, server 103 uses an identifier of a base station of cellular region 135I in which mobile device 110I is located, to access impairment SPS satellite data 140I, which includes identification of impairment of satellite(s) in region in 135I, and optionally identification of type of impairment's source and optionally start time and, duration of impairment), followed by encrypting and transmitting impairment SPS satellite data 140I to mobile device 110I.

In some embodiments, one or more processor(s) in either or both of mobile device 110 may determine a new position in operation 233 (FIGS. 2A, 2B) and/or server 103 may determine a new position (of a mobile device 110) in operation 253 (FIG. 2F), by performing method 410 including acts 411-415 illustrated in FIG. 4A, as follows. Specifically, in act 411, the processor may retrieve from a memory, pseudoranges, time and ephemeris of a specific unimpaired SV, followed by an act 412 in which the time and ephemeris retrieved are used to compute a state of the unimpaired SV, wherein the state may include, for example, position and/or velocity of the unimpaired SV. Acts 411 and 412 are repeatedly performed, for three or more SVs that are unimpaired and visible to a mobile device whose new position is to be computed. Next, in an act 413, the processor(s) set up multiple pseudorange equations (one for each SV), as follows:

PseudoRange=Clock Bias+|SV Pos−User Pos|

In the above formulation, SV Pos denotes a first position vector of a satellite SV in three dimensions, and User Pos denotes a second position vector in three dimensions of the mobile device on earth, and the vertical bars indicate that a magnitude of vector difference is to be added to clock bias (which is an offset between time at the mobile device and time at the satellite). User Pos and Clock Bias are unknown in this example, in which User Pos includes three coordinates (x, y, z) and Clock Bias includes a fourth coordinate of time (t), for all four of which a solution is obtained in a normal manner (e.g. by solving four simultaneous linear equations, using matrix operations) in act 414 (FIG. 4A).

Figure 5A:
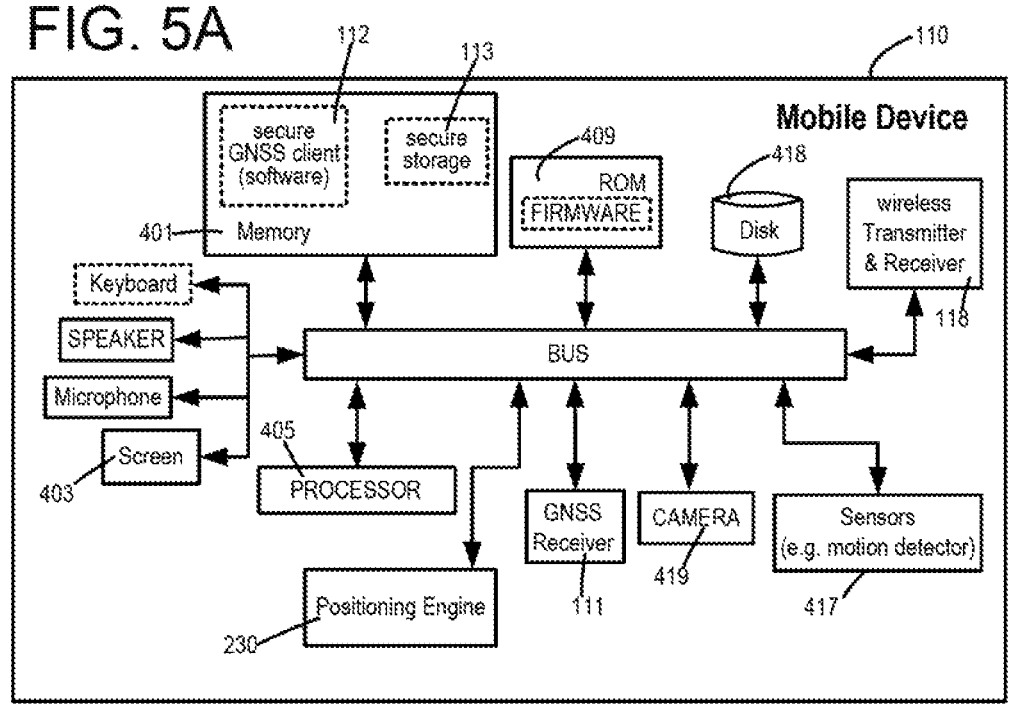
FIGS. 5A and 5B illustrate circuitry in an example of a mobile device 110 and a server 103, in certain embodiments.
Figure 5B:
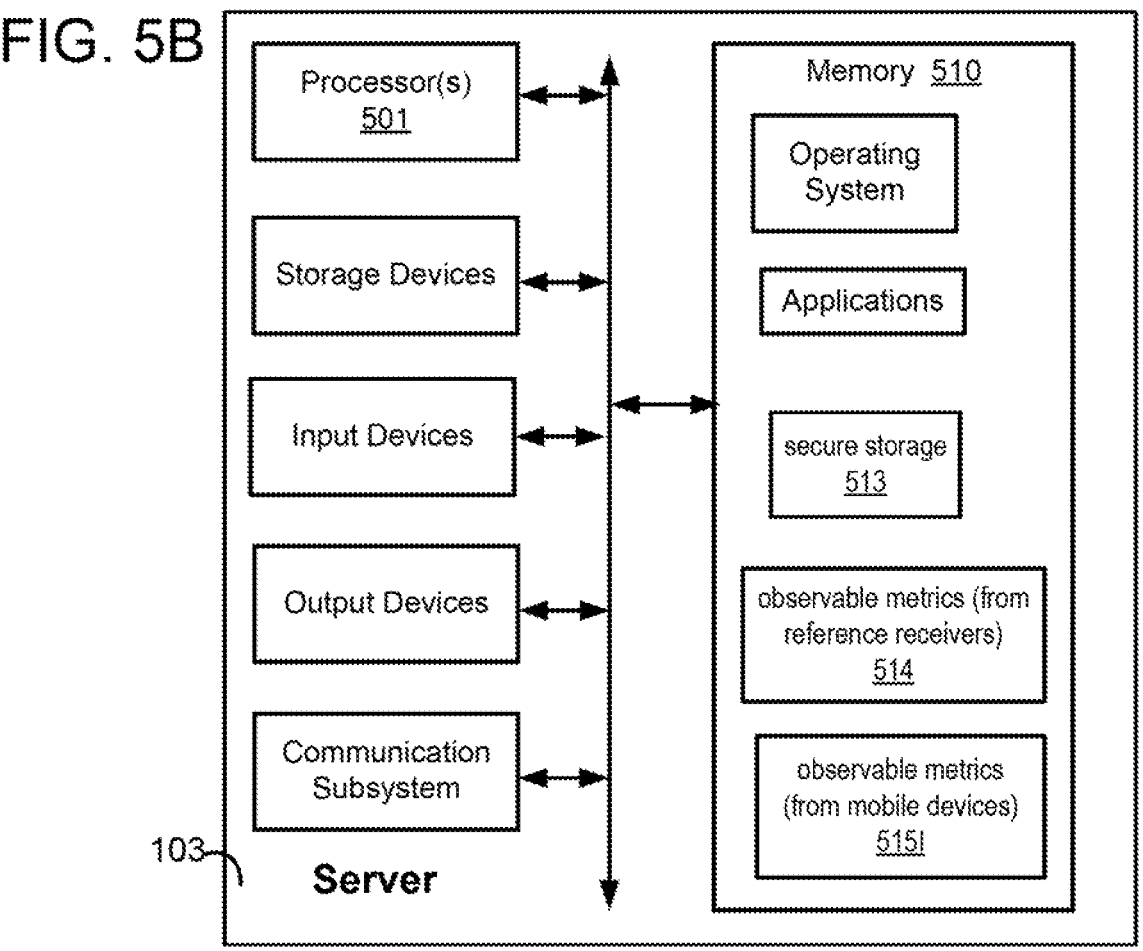

Specifically, in act 414 (FIG. 4A), the processor(s) solve a linearized version of the pseudorange equations set up in act 413, e.g. by using a weighted least squares formulation, known to a skilled artisan. Completion of act 414 results in three dimensional (3D) coordinates (x, y, z) of the mobile device's position on earth, as well as a time coordinate (t), all of which are stored in act 415 by the processor(s) performing method 410, in memory (e.g. in secure storage 113 in mobile device 110 as shown in FIG. 5A, or in secure storage 513 in server 103 as shown in FIG. 5B).

In some embodiments, mobile device 110 performs an operation 226 (described above in reference to FIG. 2B), to identify impaired SVs using observable metrics based on GSM-GNSS clock offset, as illustrated by a method 420 including acts 421-428 (FIG. 4B), as follows. Specifically, in act 421, one or more processor(s) 405 in mobile device 110 compute a current time in a SV, using GSM/Cell Offsets, as follows: Time=Local Cellular time+Time Offset. In performing the act 421, time in multiple cell towers (which may be accessible to wireless transceiver 118 in mobile device 110) can be averaged, to obtain more reliable local cellular time, in the above equation. In the above equation, Time Offset is a difference between the cellular network's time and a time base of SPS satellites) in a GNSS constellation, received by mobile device 110 from server 103 in operation 226 as described above in reference to FIG. 2B. Thereafter, also in act 421, processor(s) 405 in mobile device 110 determine uncertainty in computed time, as follows: Uncertainty=Uncertainty of Local Cellular Time+Uncertainty of Time Offset.

In some embodiments, mobile device 110 performs another act 422 (FIG. 4B), to determine a time of transmission of a signal from a specific GNSS SV, as follows: Time of Transmission=SV Bit number+SV Bit Offset+SV Code Phase. In the just-described formulation, SV Bit number may be decoded from transmitted data, SV Bit Offset may be obtained from synchronizing SV Data bit edges, SV Code phase may be obtained from tracking code phase for SV signals. Thereafter, in act 423, mobile device 110 checks if an approximate position thereof is known, e.g. based on a location of a cellular base station with which mobile device 110 is currently in communication.

If the answer in act 423 is no, mobile device 110 goes to act 424, and computes received time as follows: Received Time=Time of Transmission+Default Time of Flight. In some embodiments, 80 milliseconds is used as the default time of flight, because SVs are in determined orbits around the earth, and the time it takes for signals to travel from SVs to earth's surface is bounded (approximately 80 milliseconds). In addition, in act 424, mobile device 110 additionally computes uncertainty in the received time as follows: Received Time Uncertainty=Uncertainty of Approximate Position/Speed of Light. In the just-described formulation. Uncertainty of Approximate Position describes how accurate the Approximate Position is estimated to be. In some embodiments, location of a wireless transmitter of a cellular base station in communication with mobile device 110 is used as an approximate location of mobile device 110, and the uncertainty is in the range of few kilometers to 10 s of kilometers. On completion of act 424, mobile device 110 goes to act 426, described below. In act 423, if the answer is yes, then mobile device 110 goes to act 425 and computes received time as follows: Received Time=Time of Transmission+Time of Flight. In this formulation, Time of flight is time taken by a signal to go from SV to mobile device 110. On completion of act 425, mobile device 110 goes to act 426.

In act 426 (FIG. 4B), mobile device 110 compares (a) received time for the specific SV with (b) time computed (e.g. in act 421 above). If the times (a), (b) differ by more than a threshold (which may be predetermined, or automatically selected), in act 427 mobile device 110 identifies the specific SV as RAIM-failed, else confirms the specific SV as unimpaired. Thereafter, in act 428, mobile device 110 stores in memory 401, the identification made (in act 427) if this SV is identified as mobile-RAIM-failed (or marks this SV as unimpaired if confirmed), and also sends an identifier of the SV to server 103 when the SV is determined to be mobile-RAIM-failed.

In several embodiments, threshold comparison in act 427 (FIG. 4B) is performed using a Chi-Square test, to determine whether the SV is impaired or not, in such embodiments, the chi-square test is configured to test a measurement residual (e.g. received time) against an expected model (e.g. computed time), and if the residual is larger than an expected amount by a factor n (for example n=3) then the SV is identified as impaired. In several embodiments, the just-described factor n (with which an expected amount of time difference Δt may be multiplied) is automatically selected based on a type of source of impairment. For example, the just-described factor n, which is used in act 427 is set to value a 2 (or in some cases to value n=1) when a type of source of impairment has a first value 147A that denotes "co-located mobiles". But for all other types of sources of impairments, the just-described factor n, which is used in act 427 is set to value n=3 (which is less stringent, and thus easier for an SV to be confirmed as unimpaired). In alternative embodiments, the just-described factor n is predetermined to be same (e.g. value n=3) for all SVs (regardless of type of source of impairment or unimpaired).

Hence, some embodiments of method 420 (FIG. 4B) may perform a Chi-Square test in act 427, to test a parameter (e.g. time difference) against a computed uncertainty thereon, by using the multiplying factor "n". The value of this multiplying factor "n" determines, in such embodiments, the reliability and/or robustness of the test in act 428. For example multiplying factor of n=3 provides 99% probability that the test identifies impaired satellites, whereas a factor of n=6 improve this test to provide better than 99.99% probability (for Gaussian distributions).

Therefore, in some embodiments, the above-described act 427 (FIG. 4B) is performed by a processor in mobile device 110 programmed with software comprising instructions, to implement a means for performing a test (such as the Chi-Square test) on one or more observable metric(s) of a signal received from an impaired satellite, to determine whether to include an observable metric measured thereof (e.g. a pseudorange), in determination of a new position of mobile device 110.

In some embodiments, server 103 performs an operation 323 (described above in reference to FIG. 3B), to apply a regional integrity monitoring technique, as illustrated by a method 430 including acts 431-436 (FIG. 4C), as follows. Specifically, in act 431, one or more processor(s) 501 in server 103 retrieve from memory 510, observable metrics 515I (e.g. in the form of pseudoranges) that are measured by multiple mobile devices, such as mobile device 110I (described above). Then, in act 432, server 103 uses time and ephemeris, to compute a state of a sped tic SV (position, velocity, etc.). The just-described acts 431 and 432 are repeated for each SV that is unimpaired, thereby to determine the states of unimpaired SVs. Subsequently, in act 433, server 103 groups the mobile devices 110A-110N (FIG. 1D) by geographic proximity (e.g. within a certain radius of a cellular base station, or by common SN's seen by mobile devices).

Thereafter, in act 434 (FIG. 4C), server 103 sets up pseudorange equations for a specific group of mobile devices, e.g. mobile devices 110I, 116I and 117I that are currently located in cellular region 135I (FIG. 1D). The pseudorange equations set up in act 434 are similar to the pseudorange equations set up in act 413 in, method 410 described above in reference to FIG. 4A, except that act 434 is performed repeatedly, for pseudorange measurements received from all mobile devices 110I, 116I and 117I which are currently in cellular region 135I.

Thereafter, in act 435 (FIG. 4C), server 103 uses the just-described RAIM formulation for a specific group of mobile devices, to determine if one or more SVs are identified as outliers, in a normal manner. Specifically, server 103 eliminates one measurement at a time from the above-described formulation for the specific group, and evaluates an answer obtained (for a mobile device's position) without the eliminated measurement, and checks if everything about that answer is consistent. If server 103 determines that including one particular measurement makes the answer inconsistent, then this measurement is determined to be an outlier.

Subsequently, in act 436 (FIG. 4C), server 103 collects pseudoranges of SVs that are commonly identified as outliers for positions of multiple mobile devices, to form an impaired set of pseudoranges, and then identifies one or more common outlier SVs as being impaired (and, in some embodiments also assigns "co-located mobiles" as a value of a type of source, of impairment). Thereafter, server 103 repeats the acts 434-436 for all other groups of mobile devices, which are located in corresponding cellular regions.

In some embodiments of the type described above, wherein server 103 is programmed with software comprising instructions to perform method 430 (FIG. 4C), having multiple mobile devices 110A-110N (FIG. 1D) identify common impairments, increases the probability that the detection is correct, which therefore makes detection of impaired SPS satellites much more reliable and robust. For example if detection probability for one mobile device is Pd, then the detection probability for n mobile devices would be $1-(1-Pd)^n$.

Figure 4C:
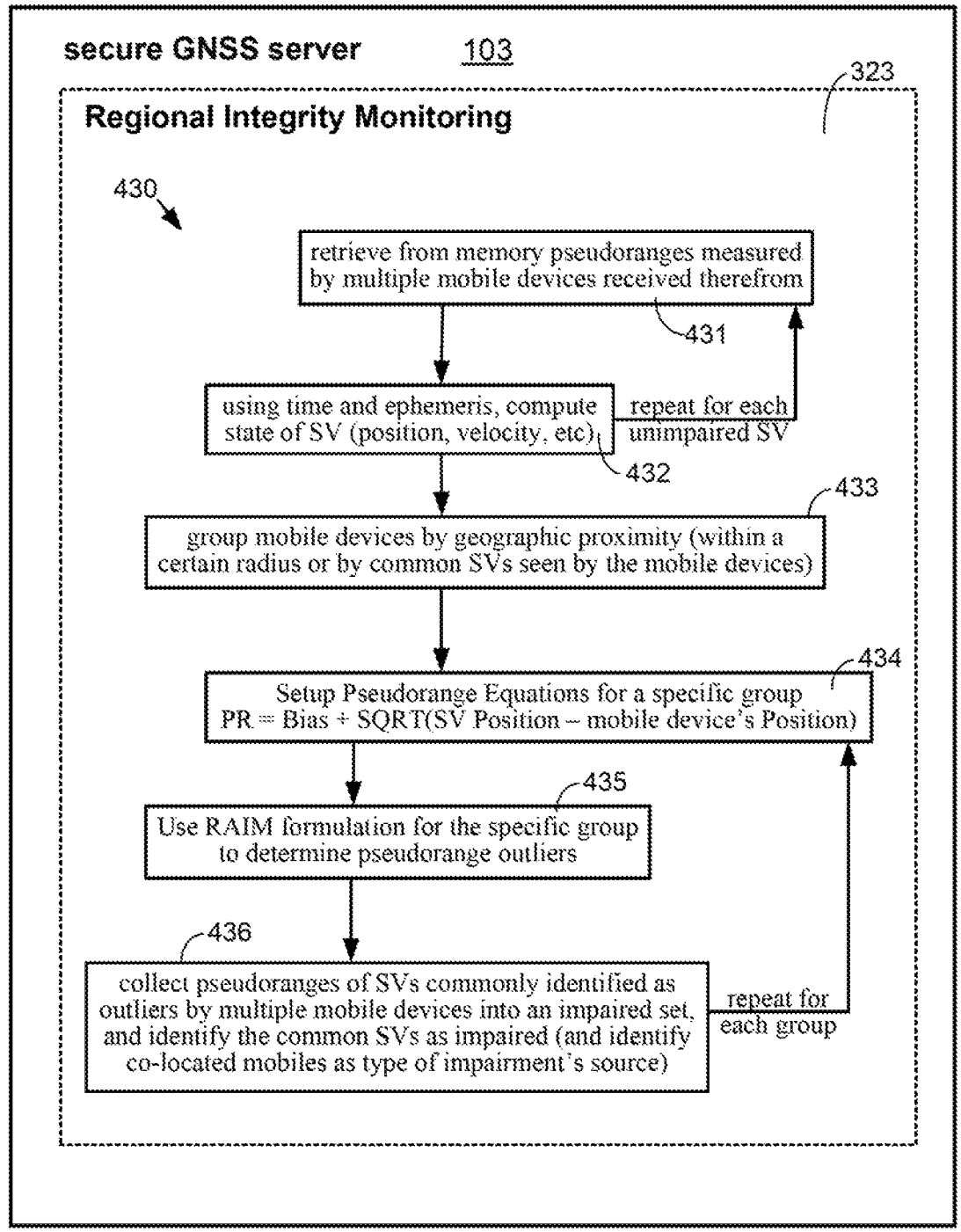
FIGS. 4C and 4D illustrate, in additional flow charts, acts performed in some embodiments of server 103, of the type shown in FIGS. 1A-1D.
Figure 4D:
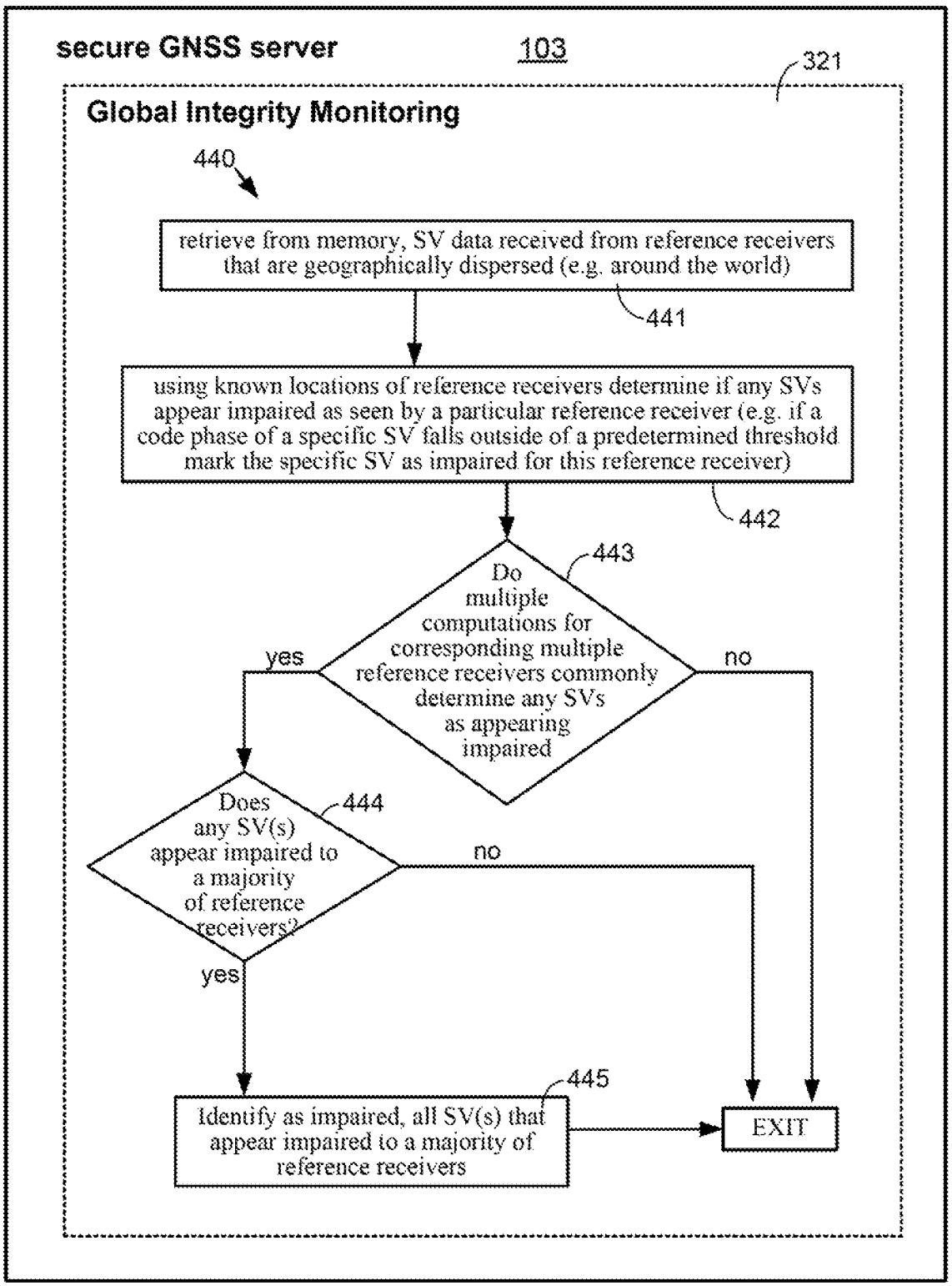

In some embodiments, server 103 performs an operation 321 (described above in reference to FIG. 3B), to apply a global integrity monitoring technique, as illustrated by a method 440 including acts 441-445 (FIG. 4D). The global integrity monitoring technique can be implemented as an extension of RAIM (which is specific to one receiver), although there are more observable metrics (e.g. pseudoranges) than the number of unknowns to be determined, and a few of these observable metrics may be incorrect. The global integrity monitoring technique uses redundancy to determine (1) there is an error, and (2) which observation(s) are in error. With measurements received from multiple reference receivers 130A-130T (FIG. 1C), there are more measurements than number of unknowns to be determined, for all the T reference receivers.

For every reference receiver there can be up to 4 unknowns to be determined (Position X, Position V, Position Z, and Time Offset). So there can be 4T unknowns to be determined. If every reference receiver sends more than 4 observable metrics, there are more than 4T observable metrics 514 (FIG. 5B) in memory 510 of server 103. Hence, server 103 may determine if there are impairments in any observable metrics 514 and if so which specific observable metrics are in error. To reduce computation burden, the server 103 may group the T receivers into smaller sub groups and determine common pseudoranges that are impaired within those sub groups. The just-described sub-grouping can be geography based, e.g. reference receivers within certain distance from one another can be formed by server 103, into one sub group and processed as a cluster.

Accordingly, in some embodiments, in an act 441, server 103 retrieves from memory 510, observable metrics 514 received from reference receivers 130A 130T (FIG. 1C). Thereafter, in an act 442, server 103 uses known locations of reference receivers 130A-130I to determine if any SPS satellites 120A-120Z (FIG. 1C) appear impaired, as seen by a particular reference receiver 130I (e.g. if a code phase of a specific SV falls outside of a predetermined threshold, the specific SV is marked by server 103 as impaired, for this reference receiver 130I). Note that as reference receivers are stationary and located at known locations, the only one variable is time in each reference receiver, which therefore needs to be estimated. Hence, all SV code phases compared to one reference SV should normally fall within a predetermined threshold.

Thereafter, in act 443, server 103 checks if multiple computations for corresponding multiple reference receivers commonly determine any SVs as appearing impaired. If the answer in act 443 is no, then server 103 exits the global integrity monitoring technique, with no SV identified as impaired. If the answer in act 443 is yes, then server 103 goes to act 444. In act 444, server 103 checks if any SV(s) appear impaired to a majority of reference receivers, e.g. more than 50% of T reference receivers. If the answer in act 444 is no, then server 103 exits the global integrity monitoring technique, with no SV identified as impaired. If the answer in act 444 is yes, then server 103 identifies as impaired, all SVs that appear impaired to the majority of reference receivers. And, in some embodiments, in act 445, server 103 also assigns "reference receivers" as a value of a type of source of impairment.

In some embodiments, a server 103 may be authenticated by using any one of several techniques of the type described in US Publication 2014/0351886. For signaling between a mobile device 110 and server 103 that is not secure (e.g. which may be intercepted by a third party), various known methods of authentication may be used (e.g., Message Digest 5 (MD5), Hash Message Authentication Code (HMAC), Cipher-based Message Authentication Code (CMAC), etc.), in which case a common secret key may be used, which may be hidden and not signaled openly. The common secret key may be agreed by a provider of assistance data that operates server 103, and another provider that manufactures mobile device 110, in the case that a relationship exists between these two providers. Such a secret key may be configured in each mobile device 110 manufactured by the mobile device provider and in each server 103 belonging to or operated by the assistance data provider. Thereafter, the just-described secret key, which is configured in server 103 and in mobile device 110, may be used to authenticate a mobile device manufacturer to an assistance data provider and/or the assistance data provider to the mobile device manufacturer. If signaling between a mobile device 110 and server 103 is secure (e.g., as limy occur within a SUPL session), a common secret key may be used as a password and transferred openly from mobile device 110 to server 103 since it cannot be intercepted by other parties.

In some embodiments, to transfer authentication related data between server 103 and mobile device 110, when authentication of an assistance data provider and/or mobile device manufacturer occurs as part of a SUPL session, the authentication data may be transferred using an existing authentication protocol, such as IETF EAP. Alternatively, the authentication data may be transferred using customized new parameters in SUPL or in a positioning protocol used with SUPL such as LPPe.

FIG. 5A provides a schematic illustration of one embodiment of mob device 110 that can perform the methods provided by various embodiments, as described herein. Similarly, FIG. 5B provides a schematic illustration of one embodiment of server 103 that can perform the methods provided by various embodiments, as described herein. FIGS. 5A and 5B are meant only to provide generalized illustrations of certain components of mobile device 110 and server 103 respectively, any and/or all of which may be utilized in certain embodiments as appropriate. FIGS. 5A and 5B therefore, broadly illustrate how individual system elements may be implemented in a relatively separated or relatively more integrated manner in mobile device 110 and server 103.

Mobile device 110 may be any portable electronic device such as a cellular or other wireless communication device, personal communication system (PCS) device, personal navigation device (PND), Personal Information Manager (PIM), Personal Digital Assistant (PDA), laptop, camera, smartphone, or other suitable mobile platform that is capable of providing a user interface. Mobile device 110 includes hardware elements that can be electrically coupled via a bus (or may otherwise be in communication, as appropriate).

The hardware elements of mobile device 110 may include one or more processors 405 configured to perform one or more acts and/or blocks and/or operations described above, and may further include without limitation one or more general-purpose processors and/or one or more special-purpose processors (such as digital signal processing chips). Mobile device 110 may further include a positioning engine 230 implemented in hardware circuitry, and a GNSS receiver 111 also implemented in hardware, with either or both coupled to memory 401 and processor(s) 405 (FIG. 5A).

Mobile device 110 may include one or more input devices, such as touch-sensitive screen 403 and/or a microphone, and/or a speaker, a keyboard and/or the like. Mobile device 110 may also include a camera 419. Mobile device 110 may further include (and/or be in communication with) one or more non-transitory memory 401 and/or storage device 418, and either or boat of which can comprise, depending on the embodiment, local and/or network accessible storage, and/or can include, without limitation, a disk drive, a drive array, an optical storage device, a solid-state storage device such as a random access memory ("RAM"). Mobile device 110 may include read-only memory ("ROM") 409, which can be programmable, flash-updateable and/or the like. Storage device 418 may be configured to implement any appropriate data storage, including without limitation, various file systems, database structures, and/or the like, to implement the mobile device 110, as may be apparent to a skilled artisan.

Mobile device 110 may also include a wireless transceiver 118 (e.g. including a modem therein) and/or a wireless network card, an infrared communication device, a wireless communication device and/or chipset (such as an 802.11 device, a WiFi device, a WiMax device, cellular communication facilities, etc.), and/or the like. Wireless transceiver 118 may permit data to be exchanged with a cellular network (such as the network described below, to name one example), other computer systems, and/or any other devices described herein.

Wireless transceiver 118 may include circuitry to interface to various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access ((DMA) network, a Time Division Multiple Access (TDMA) network, a Frequency Division Multiple Access (TDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other radio access technology (RAT). GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an institute of Electrical and Electronics Engineers (IEEE) 802.11x network, and a WPAN may be a Bluetooth network, an IEEE 802.15x, or some other type of network. The techniques may also be used for any combination of WWAN, WLAN and/or WPAN.

The described embodiments may be implemented by wireless transceiver 118 in conjunction with Wi-Fi/WLAN or other wireless networks. In addition to Wi-Fi/WLAN signals, mobile device 110 may receive via a receiver therein (e.g. GNSS receiver 111), signals from satellites, which may be from a GPS, Galileo, Global Navigation Satellite System (GLONASS), Navigation Satellite Timing and Ranging System (NAVSTAR), QZSS, a system that uses satellites from a combination of these systems, or any satellite positioning system developed in the future, each referred to generally herein as a Satellite Positioning System (SPS) or Global Navigation Satellite System (GNSS).

In certain example implementations, an SPS may include at least one Global Navigation Satellite System (GNSS). By way of example but not limitation, a GNSS resource may include a GPS resource, an SBAS resource, a QZSS resource, a GLONASS resource, a Galileo resource, a Compass/BeiDou resource, and/or other like resources. By way of example but not limitation, a GNSS resource may be identified as being associated with a particular GNSS signal, a particular GNSS signal band, and/or particular space vehicle (SV).

Position determination method 410 (FIG. 4A) described above may be implemented in conjunction with various wireless communication networks such as a wireless wide area network (WWAN), a wireless local area network (WLAN), to wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, GLONASS or Compass may transmit a signal marked with a PN code that is distinguishable from PN codes transmitted by other SVs in the constellation (e.g., using different PN codes for each satellite as in GPS or using the same code on different frequencies as in GLONASS).

In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Mobile device 110 may be sometimes referred to as a mobile station (MS) or user equipment (UE), such as a cellular phone, mobile phone or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile device" is intended to include all devices, including wireless communication devices, computers, laptops, etc. which are capable of communication with a server, such as via the Internet, WiFi or other network, and regardless of whether satellite signal reception, assistance data reception, and/or position-related processing occurs at the device, at a server, or at another device associated with the network. Any operable combination of the above are also considered a "mobile device."

In many embodiments, mobile device 110 may include a non-transitory memory 401 (FIG. 5A), which can include a random-access memory (RAIM) or read-only (ROM) device, as described above. One or more of the storage devices and/or memory 401 of mobile device 110 may comprise software (e.g. secure GNSS client 112), to perform acts and/or blocks and/or operations of a method shown in FIGS. 2A-2F, 3A, 38, 4A-4D, 6, 7A-7D, 8, and 9A-9D including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above, liar example as described with respect to FIGS. 2A-2F, 3A, 38, 4A-4D, 6, 7A-7D, 8, and 9A-9D might be implemented as code and/or instructions executable by mobile device 110 (and/or one or more processor(s) 405 therein) in an aspect, then, such code and/or instructions can be used to configure and/or adapt a general purpose computer (or other device) to perform one or more operations in accordance with the described methods.

A set of these instructions and/or code to perform a method of FIGS. 2A-2F, 3A, 3B, 4A-4D, 6, 7A-7D, 8, and 9A-9D might be stored on a computer-readable storage medium, such as non-transitory memory 401 described above and/or storage device 418. In same cases, the storage device 418 and/or the non-transitory memory 401 might be incorporated within a computer system, such as mobile device 110. In other embodiments, the storage device 418 and/or the non-transitory memory 401 might be separate from mobile device 110 (e.g., a removable storage medium, such as a compact disc), and/or provided in an installation package, such that the storage medium can be used to program, configure and/or adapt a general purpose computer with the instructions/code stored thereon. These instructions might take the form of executable code, which is executable by mobile device 110 and/or might take the form of source and/or installable code, which, upon compilation and/or installation on mobile device 110 (e.g., using any of a variety of generally available compilers, installation programs, compression/decompression utilities, etc.) takes the form of executable code.

Substantial variations may be made in accordance with specific requirements. For example, customized hardware might also be used in mobile device 110, and/or particular elements might be implemented in hardware, software (including portable software, such as applets, etc.), or both to perform any of operations or acts shown in FIGS. 2A-2F, 3A, 3B, 4A-4D, 6, 7A-7D, 8, and 9A-9D. For example, some or all of the procedures of the described methods may be performed by mobile device 110 in response to processor(s) 405 executing one or more sequences of one or more instructions (which might be incorporated into an operating system and/or other code, such as an application program) contained in memory 401. Such instructions may be read into non-transitory memory 401 horn another computer-readable medium, such as one or more of the storage device(s) 411.

If implemented in firmware and/or software, instructions to perform a method of FIGS. 2A-2F, 3A, 3B, 4A-4D, 6, 7A-7D, 8, and 9A-9D may be stored as on one or more non-transitory computer-readable storage media. Examples include non-transitory computer-readable storage media in physical form encoded with a data structure and non-transitory computer-readable storage media encoded with a computer program. Non-transitory computer-readable storage media may take the form of an article of manufacture. Non-transitory computer-readable storage media in physical form includes any physical computer storage media that can be accessed by a computer. By way of example, and not limitation, such non-transitory computer-readable storage media in physical form can comprise SRAM, ROM, EEPROM, CD-ROM or other optical disk storage, magnetic disk storage or other magnetic storage devices, or any other non-transitory medium in physical form that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media in physical form.

In some embodiments, one or more position(s) of a handset is/are determined, by avoiding use of spoofed GNSS signals. In several embodiments, position determination may be done locally in a handset, or in a server. When done in a server, the server may store a series of position(s) collected over time, as a trace of the handset. Regardless of whether determined locally or in a server, a determined position(s) may be paired, in some embodiments, with a new private certificate, to indicate authenticity of the position(s). Depending on the embodiment, certificate(s) and position(s) protected thereby can be stored locally or centrally, and supplied locally or over a network, to any application that requires certified position(s) of a handset. During position determination, spoofed GNSS signals may be avoided in some embodiments, by not using any modulation data from a GNSS satellite, and instead using substitute modulation data: (a) within a server that determines positions based on observable metrics received from multiple handsets via secure channels or (b) locally within each handset that determines its own position based on substitute modulation data received via a secure channel from a server. Spoofed GNSS signals may be further avoided in certain embodiments, by not using observable metrics identified (either by handset or by server) (a) as impaired via a secure channel or (b) based on time derived from a multi-technology source, e.g. WWAN or WLAN.

In some embodiments, new position(s) determined from spoof-avoided and/or unimpaired SPS satellite signals are paired with a new certificate, to indicate authenticity of the new position(s). Moreover, in certain embodiments, a server determines positions of handsets, based on locally-stored substitute modulation data (e.g. Ephemeris), and observable metrics received from handsets via secure communication channels. Furthermore, in several embodiments, each handset determines its own position, using observable metrics received from satellites, and substitute modulation data received via a secure communication channel from a server. Various embodiments of the type just described, in the preceding sentence, avoid observable metrics from SPS satellites that are expressly identified as impaired (e.g. by a server), via a secure communication channel. Moreover, some embodiments avoid observable metrics that are identified locally as impaired (within a mobile device), based on use of time from a non-satellite source (which may be a multi-technology source, e.g. WWAN or WLAN).

Various forms of computer-readable storage media in physical form may be involved in carrying one or more sequences of one or more instructions to the processor(s) 405 for execution. Merely by way of example, the instructions may initially be carried on a magnetic disk and/or optical disc of a remote computer. A remote computer might load the instructions into its dynamic memory and send the instructions as signals over a transmission medium to be received and/or executed by mobile, device 110. These signals, which might be in the form of electromagnetic signals, acoustic signals, optical signals and/or the like, are all examples of carrier waves on which instructions can be encoded, in accordance with various embodiments.

Wireless transceiver 118 may receive wireless signals, and the bus then might carry the received signals (and/or the data, instructions, etc. carried by the received signals) to non-transitory memory 401, from which processor(s) 405 retrieves and executes the instructions. The instructions received by memory 401 may optionally be stored on a non-transitory storage device 418 (e.g. a hard disk or flash memory) either before or after execution by processor(s) 405. Memory 401 may contain at least one database according to any of the databases and methods described herein. Memory 401 may thus store any of the values discussed in any of the present disclosures, including a position and a certificate (e.g. in a pair of checksum-protected memory locations) in storage 113 that implements secure storage (see FIG. 1A).

Many embodiments of the type described herein never use any demodulated data bit in a satellite signal received within a receiver of a mobile device. Moreover, in several such embodiments, all orbit/clock/health data used in a mobile device is only recovered from a centralized, authenticated server that uses industrial grade encryption for all communication transactions. In some such embodiments, the mobile device (which includes a secure GNSS client) is incapable of stand-alone operation of position determination (and instead, must be connected to a secure GNSS server, to determine the mobile device's position). In numerous embodiments, both the client and the server are authenticated. Thus, various such embodiments are implemented to use a new server type that only works with authenticated clients.

Moreover, in many embodiments, the mobile devices are configured to never set time front a GNSS signal. Instead, some embodiments of mobile devices may replace time setting with GTP TDP and/or use certified time supplied by a server. In several such embodiments, only authenticated mobile devices are allowed to access this service (for receiving time from the server). Numerous embodiments use a global set of reference receivers, to develop SV orbit clock predictions, and these reference receivers are configured to collect the measurements and raw demodulated data and send the same to a server. In many such embodiments, communications between reference receivers and a server are protected by strong usernames passwords and employ best encryption methods known, to minimize likelihood of a network attack. Furthermore, constant monitoring of all SPS satellites by secured reference receivers permits rapid identification of impaired SPS satellites and/or Constellations.

Measurement of observable metrics in mobile devices, and navigation data supplied by a server to the mobile devices in some embodiments, permit errant SPS satellites (one or more SVs, including a whole constellation in certain embodiments), to be identified in a couple of seconds. As soon as a fault is detected in several such embodiments, an alarm is sent to all registered mobile clients to block the use of this errant set of satellites. Localized spoofing of measurements is still possible in many embodiments, but this is made more difficult because navigation data is ignored. Hence in several such embodiments, spoofing is inconsistent with the secure data from the server, and therefore the spoofing easier to detect. A spoofing detection event by an authenticated and registered mobile device 110 is sent back, in many embodiments, to a server to permit alarms to be sent to all other mobile devices in its neighborhood, e.g. in the same geographic region (such as a cellular region).

Figure 6:
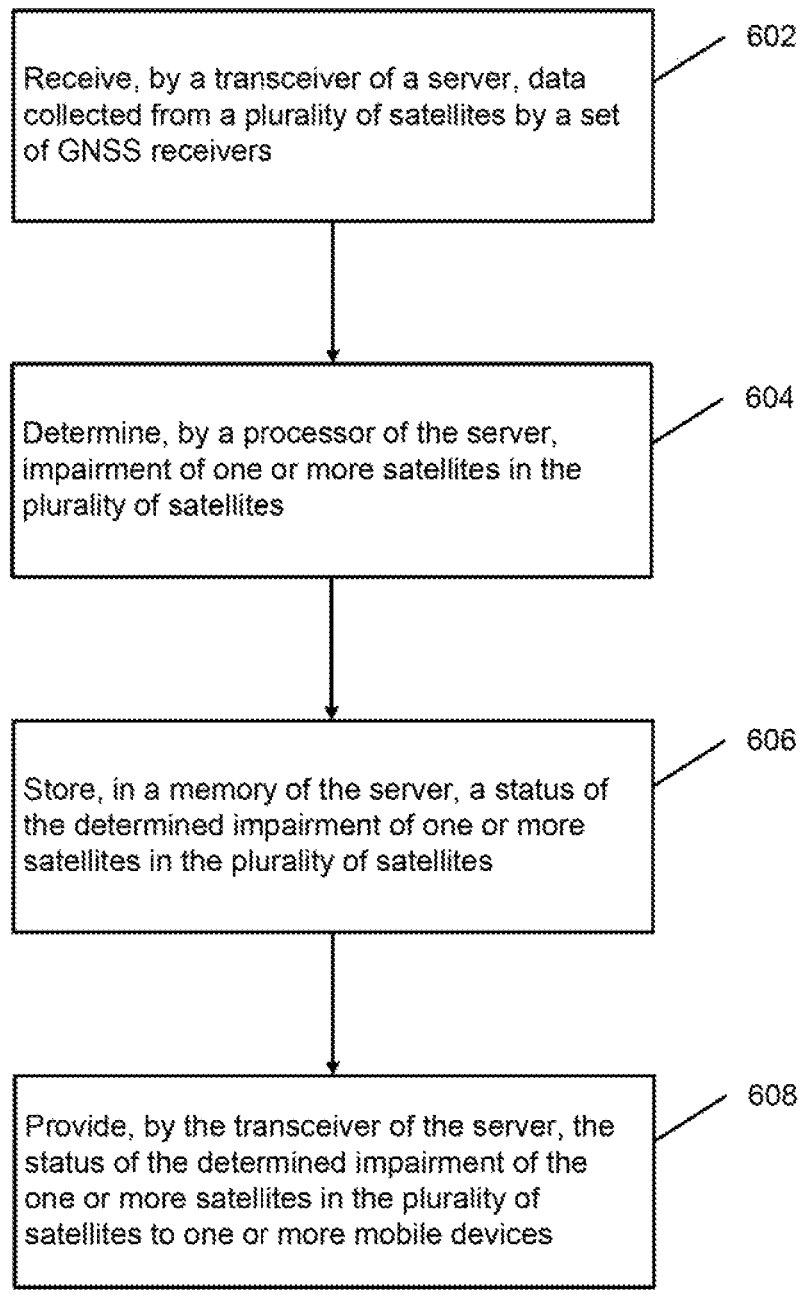
FIG. 6 illustrates an exemplary method of securing a Global Navigation Satellite System according to aspects of the present disclosure.

FIG. 6 illustrates an exemplary method of securing a Global Navigation Satellite System according to aspects of the present disclosure. As shown in FIG. 6, in block 602, the method receives, by a transceiver of a server, data collected from a plurality of satellites by a set of GNSS receivers. In block 604, the method determining, by a processor of the server, impairment of one or more satellites in the plurality of satellites. In block 606, the method storing, in a memory of the server, a status of the determined impairment of one or more satellites in the plurality of satellites. In block 608, the method providing, by the transceiver of the server, the status of the determined impairment of the one or more satellites in the plurality of satellites to one or more mobile devices. According to aspects of the present disclosure, the determined impairment of one or more satellites in the plurality of satellites may comprise at least one of: an integrity impairment received from an augmentation system, an identification of a type of source of the integrity impairment, or a combination thereof. The data collected from the plurality of satellites may comprise observable metrics of the plurality of satellites, modulation data of the plurality of satellites, or some combinations thereof. The set of GNSS receivers are located at geographically dispersed locations, and the set of GNSS receivers are protected from viruses, malware attacks and remote administration technologies.

Figure 7A:
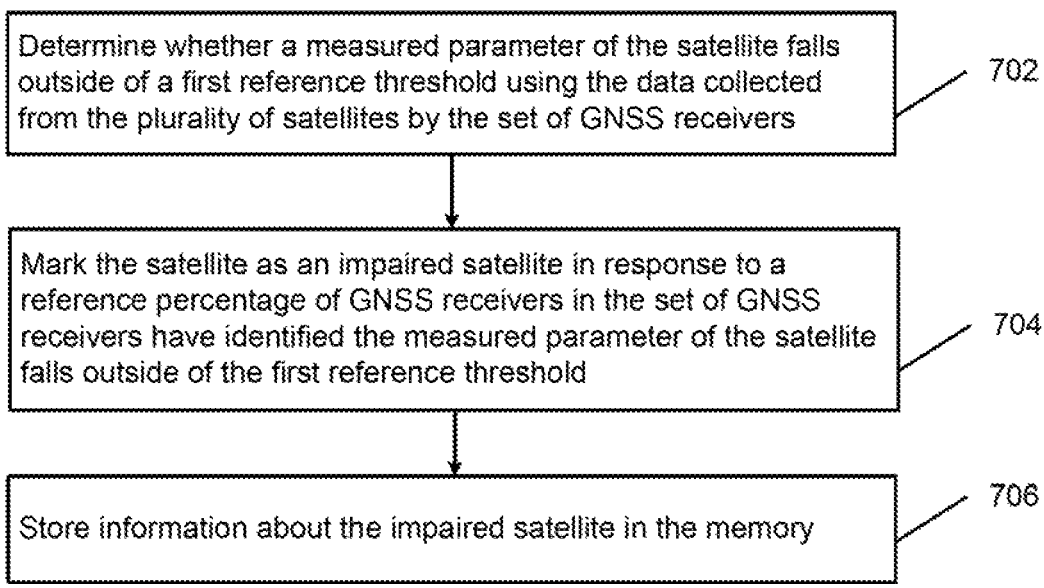
Figure 7B:
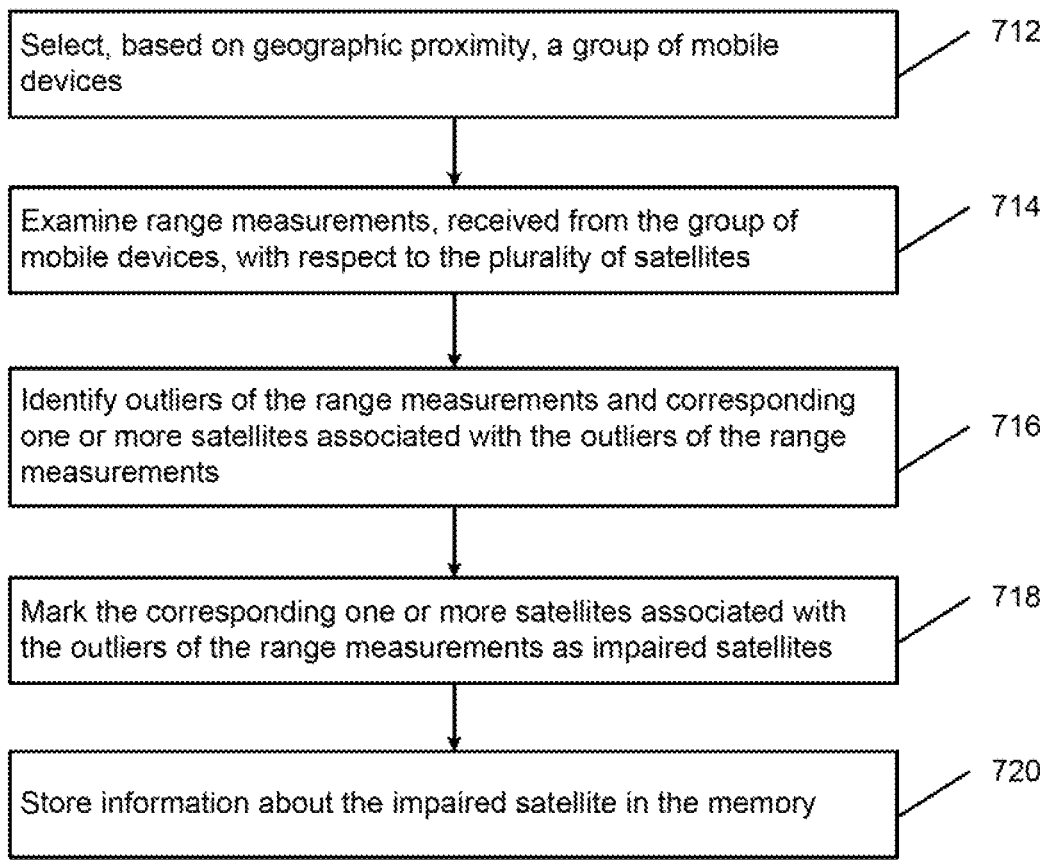

FIGS. 7A-7C illustrate various exemplary implementations of determining impairment of one or more satellites according to aspects of the present disclosure. In the example shown in FIG. 7A, in block 702, the method determines whether a measured parameter of the satellite falls outside of a first reference threshold using the data collected from the plurality of satellites by the set of GNSS receivers. In block 704, the method marks the satellite as an impaired satellite in response to a reference percentage of GNSS receivers in the set of GNSS receivers have identified the measured parameter of the satellite falls outside of the first reference threshold. In block 706, the method stores information about the impaired satellite in the memory.

FIG. 7B illustrates another exemplary implementations of determining impairment of one or more satellites according to aspects of the present disclosure. As shown in FIG. 7B. In block 712, the method selects, based on, geographic proximity, a group of mobile devices, in block 714, the method examines range measurements, received from the group of mobile devices, with respect to the plurality of satellites. In block 716, the method identifies outliers of the range measurements and corresponding one or more satellites associated with the outliers of the range measurements. In block 718, the method marks the corresponding one or more satellites associated with the outliers of the range measurements as impaired satellites. In block 720, the method stores information about the impaired satellites in the memory.

FIG. 7C illustrates yet another exemplary implementations of determining impairment of one or more satellites according to aspects of the present disclosure. As shown in FIG. 7C, in block 722, the method receives an identifier of an impaired satellite from a mobile device, where the impaired satellite is determined by the mobile device based on comparing a measured time of signal transmission between a satellite and a known location to a computed time of signal transmission between the satellite and the known location, and identifying the satellite as the impaired satellite in response to a difference between the measured time and the computed time being larger than a second reference threshold. According to aspects of the present disclosure. The status of the determined impairment of one or more satellites may comprise a number of impaired satellites in a geographic region; and for each impaired satellite in the geographic region, the status may further comprise a start time, a duration, and a type of source of impairment for each of the impaired satellite.

FIG. 7D illustrates an exemplary implementation of assisting positioning of a mobile device according to aspects of the present disclosure. In the exemplary implementation shown in FIG. 7D, in block 724, the method assists positioning of a mobile device, using the status of the determined impairment of the one or more satellites in the plurality of satellites, via a point-to-point communication session with the mobile device.

Figure 8:
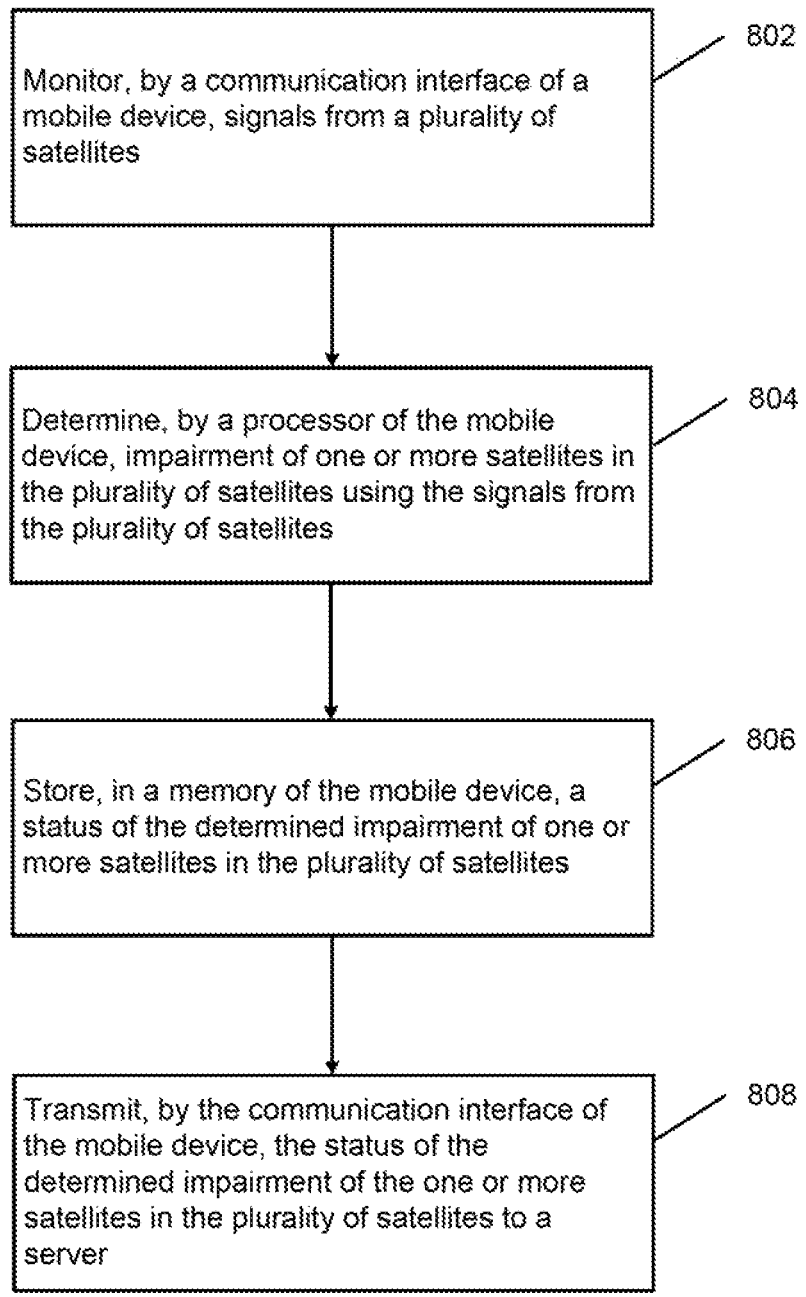
FIG. 8 illustrates another exemplary method of securing a Global Navigation Satellite System according to aspects of the present disclosure.

FIG. 8 illustrates another exemplary method of securing a Global Navigation Satellite System according to aspects of the present disclosure. In the example shown in FIG. 8, in block 802, the method monitors, by a communication interface of a mobile device, signals from a plurality of satellites. In block 804, the method determines, by a processor of the mobile device, impairment of one or more satellites in the plurality of satellites using the signals from the plurality of satellites. In block 806, the method stores, in a memory of the mobile device, a status of the determined impairment of one or more satellites in the plurality of satellites. In block 808, the method transmits, by the communication interface of the mobile deice, the status of the determined impairment of the one or more satellites in the plurality of satellites to a server.

Figure 9A:
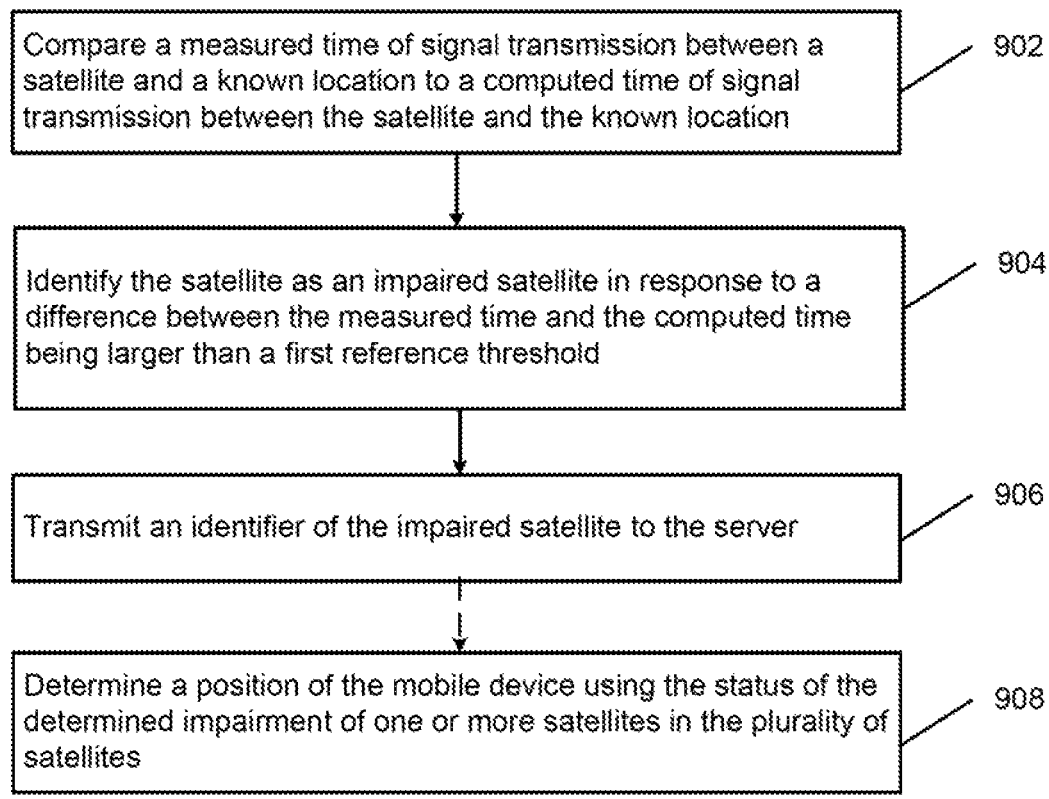
FIG. 9A illustrates yet another exemplary implementations of determining impairment of one or more satellites according to aspects of the present disclosure.

FIG. 9A illustrates yet another exemplary implementations of determining impairment of one or more satellites according to aspects of the present disclosure. As shown in FIG. 9A, in block 902, the method compares a measured time of signal transmission between a satellite and a known location to a computed time of signal transmission between the satellite and the known location. In block 904, the method identifies the satellite as an impaired satellite in response to a difference between the measured time and the computed time being larger than a first reference threshold in block 906, the method transmits an identifier of the impaired satellite to the server. According to aspects of the present disclosure, the method performed in block 906 may optionally and/or additional include the method performed in block 908. In block 908, the method determines a position of the mobile device using the status of the determined impairment of one or more satellites in the plurality of satellites.

Figure 9B:
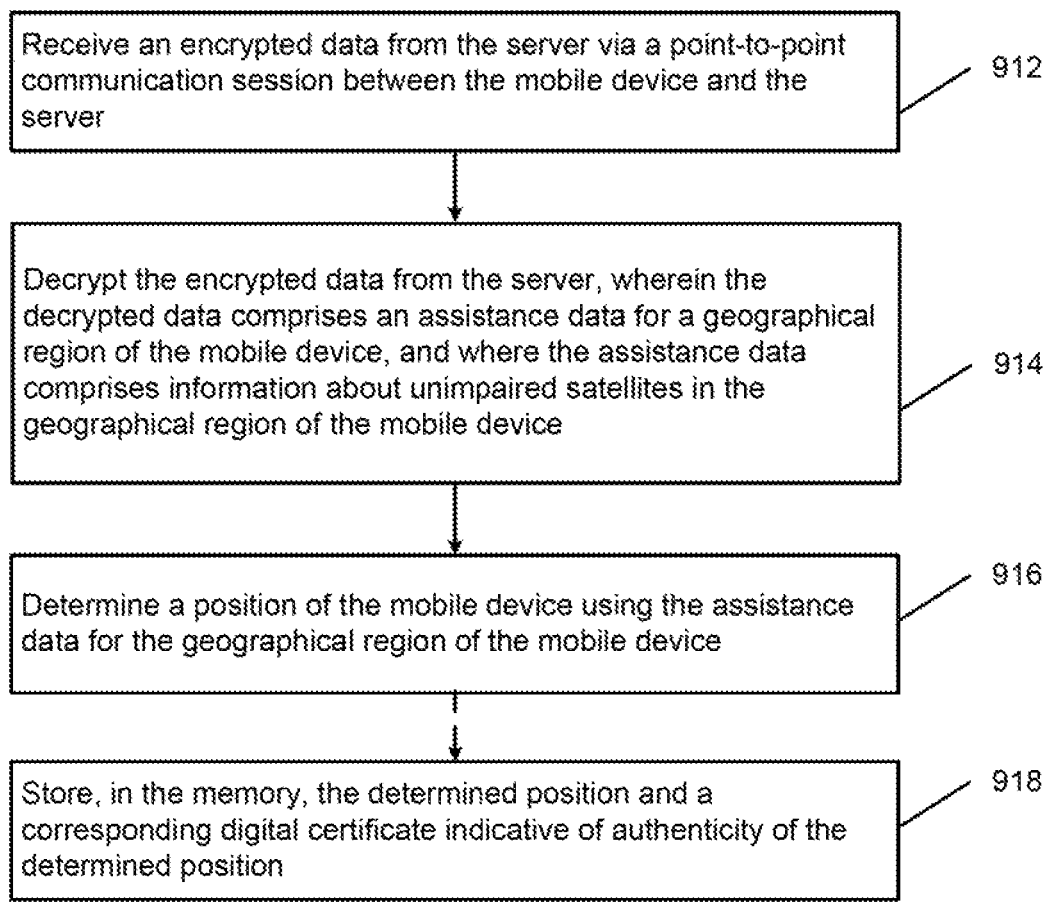
FIG. 9B illustrates an exemplary implementation of determining a position of the mobile device according to aspects of the present disclosure.

FIG. 9B illustrates an exemplary implementation of determining a position of the mobile device according to aspects of the present disclosure. In the exemplary implementation shown in FIG. 9B, in block 912, the method receives an encrypted data from the server via a point-to-point communication session between the mobile device and the server. In block 914, the method decrypts the encrypted data from the server, wherein the decrypted data comprises an assistance data for a geographical region of the mobile device, where the assistance data comprises information about unimpaired satellites in the geographical region of the mobile device. In block 916, the method determines a position of the mobile device using the assistance data for the geographical region of the mobile device.

According to aspects of the present disclosure, the method performed in block 916 may optionally and/or additional include the method performed in block 918. In block 918, the method stores, in the memory, the determined position and a corresponding digital certificate indicative of authenticity of the determined position.

Figure 9C:
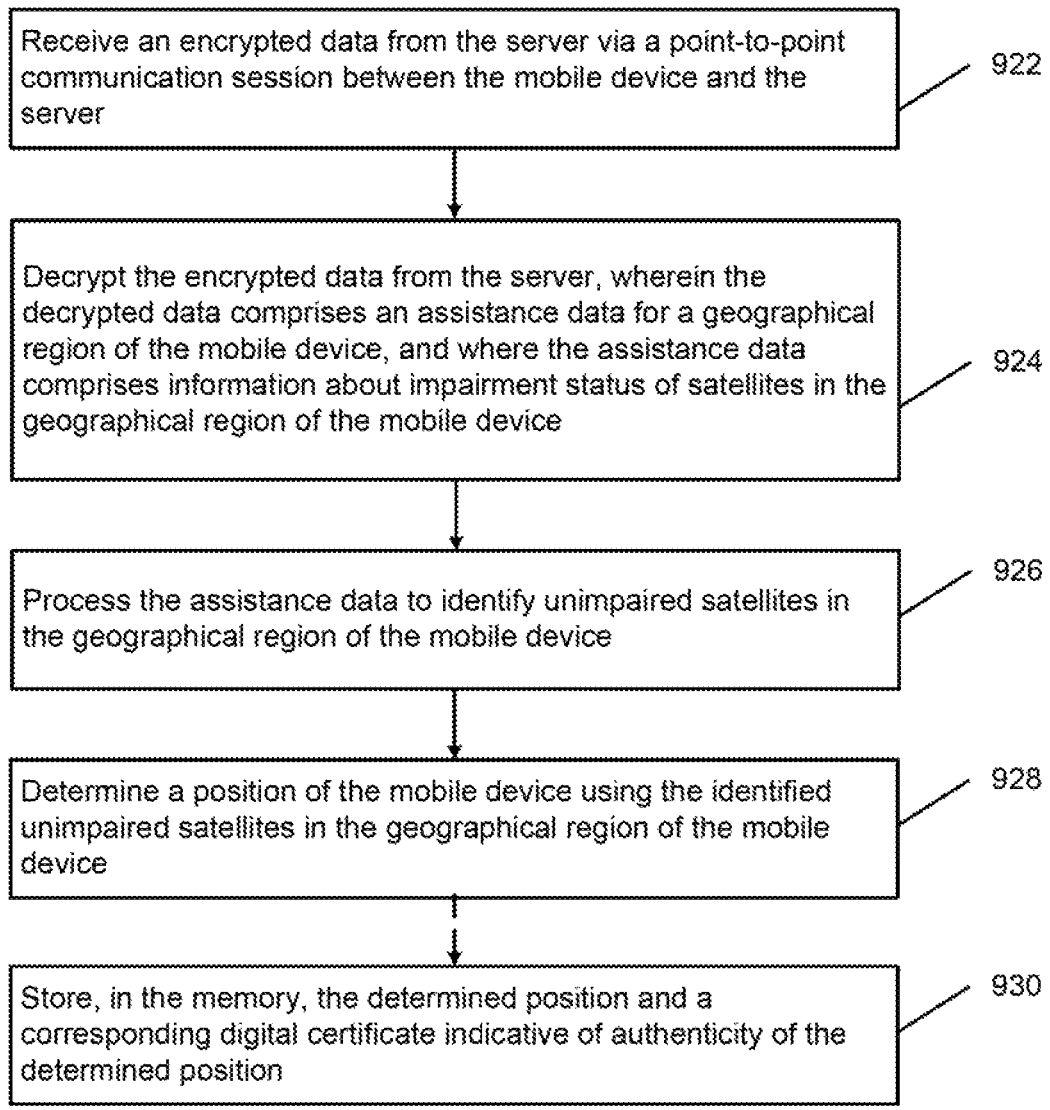
FIG. 9C illustrates another exemplary implementation of determining a position of the mobile device according to aspects of the present disclosure.

FIG. 9C illustrates another exemplary implementation of determining a position of the mobile device according to aspects of the present disclosure. In block 922, the method receives an encrypted data from the server via a point-to-point communication session between the mobile device and the server. In block 924, the method decrypts the encrypted data from the server, wherein the decrypted data comprises an assistance data for a geographical region of the mobile device, and where the assistance data comprises information about impairment status of satellites in the geographical region of the mobile device. In block 926, the method processes the assistance data to identify unimpaired satellites in the geographical region of the mobile device. In block 928, the method determines a position of the mobile device using the identified unimpaired satellites in the geographical region of the mobile device.

According to aspects of the present disclosure, the method performed in block 928 may optionally and/or additional include the method performed in block 930. In block 930, the method stores, in, the memory, the determined position as a three dimensional coordinate and a corresponding digital certificate indicative of authenticity of the determined position.

Figure 9D:
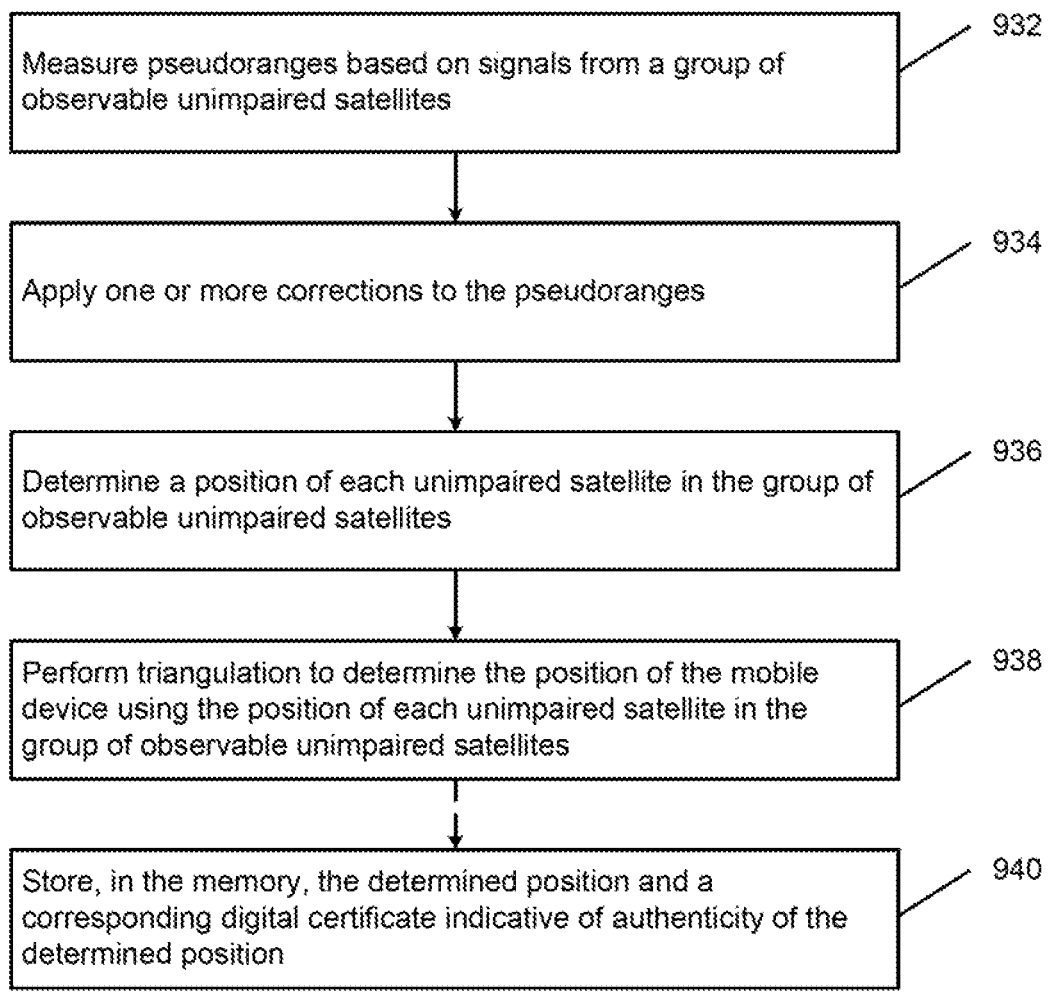
FIG. 9D illustrates yet another exemplary implementation of determining a position of the mobile device according to aspects of the present disclosure.

FIG. 9D illustrates yet another exemplary implementation of determining a position of the mobile device according to aspects of the present disclosure. As shown in FIG. 9D, in block 932, the method measures pseudoranges based on signals from a group of observable unimpaired satellites. In block 934, the method applies one or more corrections to the pseudoranges. In block 936, the method determines a position of each unimpaired satellite in the group of observable unimpaired satellites. In block 938, the method performs triangulation to determine the position of the mobile device using the position of each unimpaired satellite in the group of observable unimpaired satellites. Note that the one or more corrections applied to the pseudoranges may comprise at least one of: corrections for clock offsets, corrections for ionospheric signal propagation delays, corrections for relativistic effects, or some combinations thereof.

According to aspects of the present disclosure, the method performed in block 938 may optionally and/or additional include the method performed in block 940. In block 940, the method stores, in the memory, the determined position as a three dimensional coordinate and a corresponding digital certificate indicative of authenticity of the determined position.

Note that at least FIGS. 1A-1C, 5A-5B, 8, 9A-9C and their corresponding descriptions have provided support for the structures that comprise means for monitoring signals from a plurality of satellites; means for determining impairment of one or more satellites in the plurality of satellites using the signals from the plurality of satellites; means for storing a status of the determined impairment of one or more satellites in the plurality of satellites; means for transmitting the status of the determined impairment of the one or more satellites in the plurality of satellites to a server; means for comparing a measured time of signal transmission between a satellite and a known location to a computed time of signal transmission between the satellite and the known location; means for identifying the satellite as an impaired satellite in response to a difference between the measured time and the computed time being larger than a first reference threshold; means for transmitting an identifier of the impaired satellite to the server; means for determining a position of the mobile device using the status of the determined impairment of one or more satellites in the plurality of satellites; means for receiving an encrypted data from the server via a point-to-point communication session between the mobile device and the server; means for decrypting the encrypted data from the server, wherein the decrypted data comprises an assistance data for a geographical region of the mobile device, and wherein the assistance data comprises information about unimpaired satellites in the geographical region of the mobile device; means for determining a position of the mobile device using the assistance data for the geographical region of the mobile device; means for storing the determined position and a corresponding digital certificate indicative of authenticity of the determined position; means for receiving an encrypted data from the server via a point-to-point communication session between the mobile device and the server; means for decrypting the encrypted data from the server, wherein the decrypted data comprises an assistance data for a geographical region of the mobile device, and where the assistance data comprises information about impairment status of satellites in the geographical region of the mobile device; means for processing the assistance data to identify unimpaired satellites in the geographical region of the mobile device; means for determining a position of the mobile device using the identified unimpaired satellites in the geographical region of the mobile device means for measuring pseudoranges based on signals from a group of observable unimpaired satellites means for applying one or more corrections to the pseudoranges; means tom determining a position of each unimpaired satellite in the group of observable unimpaired satellites; means for performing triangulation to determine the position of the mobile device using the position of each unimpaired satellite in the group of observable unimpaired satellites; and means for storing the determined position as a three dimensional coordinate and a corresponding digital certificate indicative of authenticity of the determined position.

Some embodiments expose an IZat SDK to the application layer+deliver an application that allows a mobile device to register with the server. Such registration may allow such embodiments to create an account (with associated billing). In some embodiments, a secure GNSS client is distributed and installed in mobile devices, but is disabled until a mobile device has signed up (by supplying therefrom, a credit card number a bank account lumber or other payment information.). In several embodiments, a transaction of the type just described is independent of partner support. Additionally, in some embodiments, a secure GNSS client permits a Secure GNSS server to provide a signed version of a location, using private certificates that are created during account registration. In several such embodiments, use of a private certificate by a mobile device and/or server ensures that one or more new positions of a mobile device that are determined based on use of a secure GNSS client and/or secure GNSS server as described herein are available for distribution to any software and/or hardware that needs the mobile device's positions.

Moreover, in some embodiments, these positions can be cross checked against positions of the mobile device that may be obtained in other ways, using other software and/or hardware. Several embodiments support a secure location trace service, wherein, in addition to generating a secure position of a mobile device in real time on the mobile device, the mobile device may provide a secure Past Location Trace service wherein past raw measurement is provided by the mobile device to a server, and the server in turn may provide the same to other computer(s). In some embodiments, methods of the type described herein are extended to provide secure position as a service, and this secure position is treated as a certifiable service. Thus, in several embodiments, in addition to real time secure location on mobile devices, a service provides secure past locations and/or authenticated past locations reported by mobile devices, in offline server based type environment. Furthermore, certain embodiments provide sufficient information, in terms of measurement buffers from a mobile device to a server and the server produces authenticated location trace for the mobile device.

In several embodiments, a mobile devices stores measurement data that includes observable metrics, in a software-protected space in memory, and signs the stored data, when sending it to a server. Some such embodiments, are useful for law enforcement, financial transactions tracking, and secure tracking of mobile devices (making sure that a mobile device did not stray from predetermined paths) etc. Several embodiments may be implemented to provide secure authenticated "almost" real time positions, based on measurements that a server receives from mobile devices which may be some mobile devices configured with a secure GNSS client, and other mobile devices that do not contain any secure GNSS client. In some embodiments, the only data a server receives from mobile devices is raw measurements (as raw as possible, potentially multi technology measurements) and all computations using them are performed in a server, "securely". Doing such computations in a server enables use o additional information, which is not normally available in mobile devices (such as a database of maps).

Some embodiments of servers include, in assistance data that is supplied securely to mobile devices, map data Or other authenticated data available in the servers. Moreover, some embodiments of servers extend a crowd sourcing/harvesting method, to add an extra protection layer. Furthermore, some embodiments of mobile devices collect suspected interference, spoofing data from multiple mobile devices, and store the spooling data collected in a database in the server, to identify what kind of trouble is prevalent in which areas/at times of day. Several such embodiments use this data base, to augment methods of the type described herein, to be more conservative (or less conservative) in terms of certifying positions of mobile devices.

Some embodiments use only GPS observables but no modulated navigation data, to determine position of a mobile device. Moreover, several embodiments use RAIM to detect oscillator drift, and identify a specific SPS satellite's signal(s) as faulty in a specific geographic location where spoofing is happening. An encryption-protected server of several such embodiments maintains a list of pairs (of spoofed satellite and geographic region), and sends alarms that identify spoofed satellites to mobile devices (so the mobile devices may avoid using the spoofed satellite's signals). Furthermore, in some embodiments, each reference receiver locally performs detection of spoofed satellites, and forwards spoofed satellite IDs to the server. Additionally, in several embodiments, a server identifies spoofed signal(s) centrally, based on raw measurements of GPS observables received from (1) multiple reference receivers that are stationary at known positions and (2) multiple mobile devices with less precisely known position (which, although less reliable individually, is based on a large number of these raw measurements).

In several such embodiments, each mobile determines its own position, using in its GPS calculation: (a) pseudo-range measurements of satellite signals, excluding an impaired satellite identified via a secure communication channel from a server, in combination with (b) broadcast ephemeris being totally replaced in the mobile by ephemeris data received via the secure communication channel. Furthermore, many embodiments combine (a) a set of geographically dispersed GNSS receivers protected from known problems ("integrity" receivers) in comb nation with (b) server extraction of broadcast ephemeris from integrity receivers, followed by server distribution of this ephemeris to mobile devices via corresponding secure communication channels. Moreover, in many embodiments, a server customizes identification of impaired SPS satellites to mobile devices, based on coincidence in time and position of each mobile device relative to an impaired SPS satellite.

Many embodiments implement distribution (via a secure communication channel) of a time offset of an asynchronous wireless signal from a cellular base station, relative to a GPS time base. Combination of two or more novelties as described above, in a Secure GNSS service (implemented by use of a secure GNSS client in mobile devices, and a secure GNSS server) has synergy in some embodiments, by use of a GPS-WWAN time offset from a server to enable a mobile device to locally identify and exclude SPS satellites that are impaired, and exclusion of impaired SPS satellites makes observable metrics generated in mobile devices more accurate, and this greater accuracy in turn enables the server to use such mobile-generated data, to identify additional impaired satellites. Some embodiments of the type described herein avoid use of spoofed GPS signals, based on a combination of components, each of which may or may not be implemented as described above, depending on the embodiment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description, to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other such embodiments. Rather, the preceding description of the embodiments will provide those skilled in the art with an enabling description for implementing illustrative embodiments. Various changes may be made in the function and arrangement of elements without departing from the spirit and scope of embodiments in this description.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over, or otherwise modify embodiments described herein. Also, a number of steps may be undertaken before, during, or after the above elements are considered. Accordingly, the above description does not limit the scope of the disclosure.

Various examples have been described. These and other examples are within the scope of the following claims.

We claim:

1. A mobile device, comprising:
   a communication interface configured to monitor signals from a plurality of satellites;
   a processor configured to determine impairment of one or more satellites in the plurality of satellites using the signals from the plurality of satellites, wherein the processor is configured to determine impairment of one or more satellites by being configured to:
      compare a measured time of signal transmission between a satellite and a known location of the mobile device to a computed time of signal transmission between the satellite and the known location of the mobile device;
      identify the satellite as an impaired satellite in response to a difference between the measured time and the computed time being larger than a first reference threshold;
   a memory configured to store a status of the determined impairment of one or more satellites in the plurality of satellites; and
   the communication interface is further configured to transmit the status of the determined impairment of the one or more satellites in the plurality of satellites to a server.

2. The mobile device of claim 1, wherein the processor is further configured to:
   transmit an identifier of the impaired satellite to the server.

3. The mobile device of claim 1, wherein the processor is further configured to:
   determine a position of the mobile device using the status of the determined impairment of one or more satellites in the plurality of satellites.

4. The mobile device of claim 3, wherein the processor is further configured to:
   receive an encrypted data from the server via a point-to-point communication session between the mobile device and the server;
   decrypt the encrypted data from the server, wherein the decrypted data comprises an assistance data for a geographical region of the mobile device, and wherein the assistance data comprises information about unimpaired satellites in the geographical region of the mobile device; and
   determine a position of the mobile device using the assistance data for the geographical region of the mobile device.

5. The mobile device of claim 4 wherein the processor is further configured to:
   store, in the memory, the determined position and a corresponding digital certificate indicative of authenticity of the determined position.

6. The mobile device of claim 3, wherein the processor is further configured to:
   receive an encrypted data from the server via a point-to-point communication session between the mobile device and the server;
   decrypt the encrypted data from the server, wherein the decrypted data comprises an assistance data for a geographical region of the mobile device, and where the assistance data comprises information about impairment status of satellites in the geographical region of the mobile device;

process the assistance data to identify unimpaired satellites in the geographical region of the mobile device; and determine a position of the mobile device using the identified unimpaired satellites in the geographical region of the mobile device.

7. The mobile device of claim 3, wherein the processor is further configured to:
measure pseudoranges based on signals from a group of observable unimpaired satellites;
apply one or more corrections to the pseudoranges;
determine a position of each unimpaired satellite in the group of observable unimpaired satellites; and
perform triangulation to determine the position of the mobile device using the position of each unimpaired satellite in the group of observable unimpaired satellites.

8. The mobile device of claim 7, wherein the one or more corrections applied to the pseudoranges comprises:
corrections for clock offsets;
corrections for ionospheric signal propagation delays; and
corrections for relativistic effects.

9. A method of securing a Global Navigation Satellite System, comprising:
monitoring, by a communication interface of a mobile device, signals from a plurality of satellites;
determining, by a processor of the mobile device, impairment of one or more satellites in the plurality of satellites using the signals from the plurality of satellites, wherein determining impairment of one or more satellites comprises:
comparing a measured time of signal transmission between a satellite and a known location of the mobile device to a computed time of signal transmission between the satellite and the known location of the mobile device;
identifying the satellite as an impaired satellite in response to a difference between the measured time and the computed time being larger than a first reference threshold;
storing, in a memory of the mobile device, a status of the determined impairment of one or more satellites in the plurality of satellites; and
transmitting, by the communication interface of the mobile device, the status of the determined impairment of the one or more satellites in the plurality of satellites to a server.

10. The method of claim 9, wherein determining impairment of one or more satellites in the plurality of satellites comprises:
transmitting an identifier of the impaired satellite to the server.

11. The method of claim 9, further comprising:
determining a position of the mobile device using the status of the determined impairment of one or more satellites in the plurality of satellites.

12. The method of claim 11, wherein determining the position of the mobile device comprises:
receiving an encrypted data from the server via a point-to-point communication session between the mobile device and the server;
decrypting the encrypted data from the server, wherein the decrypted data comprises an assistance data for a geographical region of the mobile device, and wherein the assistance data comprises information about unimpaired satellites in the geographical region of the mobile device; and determining a position of the mobile device using the assistance data for the geographical region of the mobile device.

13. The method of claim 12, further comprising:
storing, in the memory, the determined position and a corresponding digital certificate indicative of authenticity of the determined position.

14. The method of claim 11, wherein determining the position of the mobile device further comprises:
receiving an encrypted data from the server via a point-to-point communication session between the mobile device and the server;
decrypting the encrypted data from the server, wherein the decrypted data comprises an assistance data for a geographical region of the mobile device, and where the assistance data comprises information about impairment status of satellites in the geographical region of the mobile device;
processing the assistance data to identify unimpaired satellites in the geographical region of the mobile device; and
determining a position of the mobile device using the identified unimpaired satellites in the geographical region of the mobile device.

15. The method of claim 11, wherein determining the position of the mobile device further comprises:
measuring pseudoranges based on signals from a group of observable unimpaired satellites;
applying one or more corrections to the pseudoranges;
determining a position of each unimpaired satellite in the group of observable unimpaired satellites; and
performing triangulation to determine the position of the mobile device using the position of each unimpaired satellite in the group of observable unimpaired satellites.

16. The method of claim 15, wherein the one or more corrections applied to the pseudoranges comprises:
corrections for clock offsets;
corrections for ionospheric signal propagation delays; and
corrections for relativistic effects.

17. A non-transitory medium storing instructions for execution by one or more processors of a mobile device, the instructions comprising:
instructions for monitoring, by a communication interface of the mobile device, signals from a plurality of satellites;
instructions for determining, by a processor of the mobile device, impairment of one or more satellites in the plurality of satellites using the signals from the plurality of satellites;
wherein the instructions for determining impairment of one or more satellites comprises:
instructions for comparing a measured time of signal transmission between a satellite and a known location of the mobile device to a computed time of signal transmission between the satellite and the known location of the mobile device;
instructions for identifying the satellite as an impaired satellite in response to a difference between the measured time and the computed time being larger than a first reference threshold;
instructions for storing, in a memory of the mobile device, a status of the determined impairment of one or more satellites in the plurality of satellites; and instructions for transmitting, by the communication interface of the mobile device, the status of the determined impairment of the one or more satellites in the plurality of satellites to a server.

18. The non-transitory medium of claim 17, wherein the instructions for determining impairment of one or more satellites in the plurality of satellites comprises:
  instructions for transmitting an identifier of the impaired satellite to the server.

19. The non-transitory medium of claim 17, further comprising:
  instructions for determining a position of the mobile device using the status of the determined impairment of one or more satellites in the plurality of satellites.

20. The non-transitory medium of claim 19, wherein the instructions for determining the position of the mobile device comprises:
  instructions for receiving an encrypted data from the server via a point-to-point communication session between the mobile device and the server;
  instructions for decrypting the encrypted data from the server, wherein the decrypted data comprises an assistance data for a geographical region of the mobile device, and wherein the assistance data comprises information about unimpaired satellites in the geographical region of the mobile device; and
  instructions for determining a position of the mobile device using the assistance data for the geographical region of the mobile device.

21. The non-transitory medium of claim 20, further comprising:
  instructions for storing, in the memory, the determined position and a corresponding digital certificate indicative of authenticity of the determined position.

22. The non-transitory medium of claim 19, wherein the instructions for determining the position of the mobile device further comprises:
  instructions for receiving an encrypted data from the server via a point-to-point communication session between the mobile device and the server;
  instructions for decrypting the encrypted data from the server, wherein the decrypted data comprises an assistance data for a geographical region of the mobile device, and where the assistance data comprises information about impairment status of satellites in the geographical region of the mobile device;
  instructions for processing the assistance data to identify unimpaired satellites in the geographical region of the mobile device; and
  instructions for determining a position of the mobile device using the identified unimpaired satellites in the geographical region of the mobile device.

23. The non-transitory medium of claim 19, wherein the instructions for determining the position of the mobile device further comprises:
  instructions for measuring pseudoranges based on signals from a group of observable unimpaired satellites;
  instructions for applying one or more corrections to the pseudoranges;
  instructions for determining a position of each unimpaired satellite in the group of observable unimpaired satellites; and
  instructions for performing triangulation to determine the position of the mobile device using the position of each unimpaired satellite in the group of observable unimpaired satellites.

24. An apparatus, comprising:
  means for monitoring signals from a plurality of satellites;
  means for determining impairment of one or more satellites in the plurality of satellites using the signals from the plurality of satellites, wherein the means for determining impairment of one or more satellites comprises:
    means for comparing a measured time of signal transmission between a satellite and a known location to a computed time of signal transmission between the satellite and the known location;
    means for identifying the satellite as an impaired satellite in response to a difference between the measured time and the computed time being larger than a first reference threshold;
  means for storing a status of the determined impairment of one or more satellites in the plurality of satellites; and
  means for transmitting the status of the determined impairment of the one or more satellites in the plurality of satellites to a server.

25. The apparatus of claim 24, wherein the means for determining impairment of one or more satellites in the plurality of satellites comprises:
  means for transmitting an identifier of the impaired satellite to the server.

26. The apparatus of claim 24, further comprising:
  means for determining a position of the mobile device using the status of the determined impairment of one or more satellites in the plurality of satellites.

27. The apparatus of claim 26, wherein the means for determining the position of the mobile device comprises:
  means for receiving an encrypted data from the server via a point-to-point communication session between the mobile device and the server;
  means for decrypting the encrypted data from the server, wherein the decrypted data comprises an assistance data for a geographical region of the mobile device, and wherein the assistance data comprises information about unimpaired satellites in the geographical region of the mobile device; and
  means for determining a position of the mobile device using the assistance data for the geographical region of the mobile device.

28. The apparatus of claim 27, further comprising:
  means for storing the determined position and a corresponding digital certificate indicative of authenticity of the determined position.

29. The apparatus of claim 26, wherein the means for determining the position of the mobile device further comprises:
  means for receiving an encrypted data from the server via a point-to-point communication session between the mobile device and the server;
  means for decrypting the encrypted data from the server, wherein the decrypted data comprises an assistance data for a geographical region of the mobile device, and where the assistance data comprises information about impairment status of satellites in the geographical region of the mobile device;
  means for processing the assistance data to identify unimpaired satellites in the geographical region of the mobile device; and
  means for determining a position of the mobile device using the identified unimpaired satellites in the geographical region of the mobile device.

30. The apparatus of claim 26, wherein the means for determining the position of the mobile device further comprises:

means for measuring pseudoranges based on signals from a group of observable unimpaired satellites;
means for applying one or more corrections to the pseudoranges;
means for determining a position of each unimpaired satellite in the group of observable unimpaired satellites; and
means for performing triangulation to determine the position of the mobile device using the position of each unimpaired satellite in the group of observable unimpaired satellites.

* * * * *